(12) United States Patent
Glanzer et al.

(10) Patent No.: US 9,160,189 B2
(45) Date of Patent: Oct. 13, 2015

(54) ELECTRONIC DEVICE CASE FOR MOBILE POINT OF SALE

(71) Applicant: Otter Products, LLC, Fort Collins, CO (US)

(72) Inventors: Matthew M. Glanzer, Loveland, CO (US); Lucas B. Weller, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 0 days.

(21) Appl. No.: 14/469,460

(22) Filed: Aug. 26, 2014

(65) Prior Publication Data

US 2014/0361081 A1  Dec. 11, 2014

Related U.S. Application Data

(63) Continuation of application No. 13/839,598, filed on Mar. 15, 2013, now Pat. No. 8,844,817.

(60) Provisional application No. 61/749,313, filed on Jan. 5, 2013.

(51) Int. Cl.
| | | |
|---|---|---|
| *G06K 7/08* | (2006.01) | |
| *H02J 7/00* | (2006.01) | |
| *G06K 7/10* | (2006.01) | |
| *G06K 7/01* | (2006.01) | |
| *G06K 7/00* | (2006.01) | |

(52) U.S. Cl.
CPC ............. *H02J 7/0054* (2013.01); *G06K 7/0004* (2013.01); *G06K 7/01* (2013.01); *G06K 7/082* (2013.01); *G06K 7/089* (2013.01); *G06K 7/10009* (2013.01); *G06K 7/10544* (2013.01); *G06K 7/10881* (2013.01); *H02J 7/0044* (2013.01)

(58) Field of Classification Search
CPC ............ G06F 17/00; G06K 7/08; G06K 7/10; G06K 9/22; G06K 7/00; G06K 19/06
USPC ............. 235/449, 375, 493, 486, 462.45, 487
See application file for complete search history.

(56) References Cited

U.S. PATENT DOCUMENTS

| | | | |
|---|---|---|---|
| 4,312,580 A | 1/1982 | Schwomma et al. | |
| 5,541,813 A | 7/1996 | Satoh et al. | |
| 5,583,742 A | 12/1996 | Noda et al. | |
| 5,669,004 A | 9/1997 | Sellers | |
| 5,681,122 A | 10/1997 | Burke | |
| 5,933,812 A | 8/1999 | Meyer et al. | |

(Continued)

FOREIGN PATENT DOCUMENTS

WO   9400037 A1   1/1994

*Primary Examiner* — Edwyn Labaze

(57) ABSTRACT

A case for an electronic device is provided. The case can include a front shell attachable to a back shell, the front shell and the back shell at least partially surrounding an electronic device installed in the case. The case can include an attached payment device reader that is electrically connected to the electronic device, an attached product information input device electrically connected to the electronic device, and a battery electrically connected to the electronic device. The case can also include an electromechanical button and a trigger member that can actuate the electromechanical button. The case can also include a rotatable mount that is removably attachable to an outer surface of the case and a hand strap attached to the rotatable mount.

22 Claims, 19 Drawing Sheets

(56) References Cited

U.S. PATENT DOCUMENTS

| | | |
|---|---|---|
| 6,043,626 A | 3/2000 | Snyder et al. |
| 6,058,356 A | 5/2000 | Swanson et al. |
| 6,169,384 B1 | 1/2001 | Shannon |
| 6,304,459 B1 | 10/2001 | Toyosato et al. |
| 6,317,313 B1 | 11/2001 | Mosgrove et al. |
| 6,405,049 B2 | 6/2002 | Herrod et al. |
| 6,456,487 B1 | 9/2002 | Hetterick |
| 6,504,710 B2 | 1/2003 | Sutton et al. |
| 6,532,152 B1 | 3/2003 | White et al. |
| 6,538,413 B1 | 3/2003 | Beard et al. |
| 6,944,782 B2 | 9/2005 | Von et al. |
| 7,116,079 B2 | 10/2006 | Bayne et al. |
| 7,312,984 B2 | 12/2007 | Richardson et al. |
| 7,318,521 B2 | 1/2008 | Lau |
| 7,359,184 B2 | 4/2008 | Lord |
| 7,400,917 B2 | 7/2008 | Wood et al. |
| 7,612,997 B1 | 11/2009 | Diebel et al. |
| 7,782,610 B2 | 8/2010 | Diebel et al. |
| 7,889,498 B2 | 2/2011 | Diebel et al. |
| 8,013,572 B2 | 9/2011 | Rodgers |
| 8,367,235 B2 | 2/2013 | Huang |
| 2003/0234291 A1* | 12/2003 | Wulff et al. ............... 235/462.48 |
| 2005/0189913 A1 | 9/2005 | Vitanov et al. |
| 2005/0247584 A1 | 11/2005 | Lu |
| 2005/0279661 A1 | 12/2005 | Hodges |
| 2006/0244422 A1 | 11/2006 | Digiovanna et al. |
| 2006/0255128 A1* | 11/2006 | Johnson et al. ............... 235/380 |
| 2006/0255493 A1 | 11/2006 | Fouladpour |
| 2007/0071423 A1 | 3/2007 | Fantone et al. |
| 2007/0115387 A1 | 5/2007 | Ho |
| 2007/0138920 A1 | 6/2007 | Austin et al. |
| 2007/0146985 A1 | 6/2007 | Mick et al. |
| 2007/0158220 A1 | 7/2007 | Cleereman et al. |
| 2008/0272741 A1 | 11/2008 | Kanamori |
| 2009/0017884 A1 | 1/2009 | Rotschild |
| 2009/0037284 A1 | 2/2009 | Lewis et al. |
| 2009/0186264 A1 | 7/2009 | Huang |
| 2010/0093412 A1 | 4/2010 | Serra et al. |
| 2011/0159324 A1 | 6/2011 | Huang et al. |
| 2012/0106037 A1 | 5/2012 | Diebel et al. |
| 2012/0314354 A1 | 12/2012 | Rayner |
| 2013/0220841 A1 | 8/2013 | Yang |
| 2013/0262248 A1 | 10/2013 | Kim et al. |
| 2014/0001081 A1* | 1/2014 | Rosen et al. ................... 206/588 |
| 2014/0249942 A1* | 9/2014 | Hicks et al. ..................... 705/17 |

* cited by examiner

ELECTRONIC DEVICE CASE FOR MOBILE POINT OF SALE

CROSS REFERENCE TO RELATED APPLICATIONS

This application is a continuation of U.S. application Ser. No. 13/839,598 filed Mar. 15, 2013, which claims the benefit of U.S. Provisional Application 61/749,313, filed Jan. 5, 2013, each of which is hereby incorporated by reference in its entirety.

FIELD

The present application relates to cases for electronic devices. More specifically, the present application relates to a protective case that includes a supplemental power source for an electronic device that may be used as a point of sale device.

BACKGROUND

Many types of electronic computing devices are used for business, information, or entertainment purposes. Electronic devices include devices such as smartphones, tablets, computers, cameras, video players, mobile communication devices, electronic media readers, audio players, handheld scanners, two-way radios, global positioning satellite (GPS) devices, and other types of electronic computing or communication devices, including combinations thereof. These devices often contain sensitive or fragile components, such as electronic components or glass screens, which can be easily damaged if the device is dropped, exposed to the elements, and/or exposed to substantial forces. To protect a device from damage, an electronic device can be installed in a protective enclosure.

Electronic devices are commonly powered by one or more internal batteries. These batteries are often rechargeable. Typically, devices with more computational power, peripherals, and/or larger displays consume available battery power more quickly. If an electronic device's battery is exhausted, the device may become unusable until the battery can be recharged or until the device can be connected to a power source. Battery capacity often becomes an issue due to factors such as: power requirements of the electronic device, extended usage of the electronic device, physical space constraints of the battery, power requirements of peripherals attached to the electronic device, temperature extremes, unavailability of a power source for charging, decreased battery capacity due to aging of the battery, decreased battery life due to the number of charge/discharge cycles a battery has endured, or combinations thereof. These factors can reduce the usefulness of electronic devices because use time of the device between recharges becomes shorter and the user must typically recharge the device before use can continue.

In some situations, a user may carry an additional battery that has been previously charged but is not electrically connected to the electronic device. The extra battery can be used as a replacement for a discharged battery. While carrying an extra battery enables the user to use the device again without having to find a charging source, this approach has drawbacks. First, the user must remember to carry the extra battery(s) because the extra battery will sometimes not be physically attached to the electronic device. Second, replacing an exhausted battery, or swapping an exhausted battery into the electronic device for charging purposes, typically requires that the device be shut down, or otherwise turned off, and restarted or rebooted. This process is often inconvenient and typically results in temporary loss of use of the device. Finally, when a charging source is available, the various batteries must be swapped into and out of the electronic device in order to charge them, unless a separate host charging device is available for the extra battery.

In some situations, some of the problems discussed above are resolved through use of a supplemental battery pack that attaches to the electronic device. The battery pack is mechanically and electrically attached to the electronic device in a manner such that the electronic device can make use of both its internal battery and a supplemental battery in the battery pack without having to shut down the electronic device, or otherwise temporarily remove power from the electronic device. However, existing solutions have drawbacks.

From an electrical standpoint, existing solutions take one of two approaches regarding how the two batteries (one battery in the case and one battery in the electronic device) are charged. In one approach, the two batteries are used and/or charged alternately. In other words, at any point in time the electronic device is only utilizing one of the batteries or is only charging one of the batteries. When the batteries are not being charged and one of the batteries becomes discharged, or becomes sufficiently low in power, the electronic device and/or the case switches usage from one of the batteries to the other. This approach has the limitation that one of the batteries may be exhausted before use of the other begins. If the internal battery is exhausted first and the electronic device is operating off of the supplemental battery, the user no longer has the flexibility of removing the case from the device and using the electronic device without it.

Similarly, when charging, current is typically directed to one of the batteries until it is fully charged. Then, the second battery is charged using the available charging current or using the stored power of the battery that has just been charged. This independent charging can result in longer charging times because the two batteries are charged sequentially, in time. Independent charging may also require that the supplemental battery is fully charged before charging of the internal battery begins. A user who wishes to make sure that charging of the internal battery begins immediately may be required to remove the case/supplemental battery to insure that charging of the internal battery begins immediately.

In an alternate approach, both batteries may be used and/or charged simultaneously as if they are a single battery. This approach presents several problems. First, the user and/or the electronic device cannot selectively control which of the batteries is charged first. Second, charging batteries in parallel may not be a preferred method if the batteries have different characteristics. Third, charging both batteries simultaneously, without other constraints, may draw too much current from the power source and/or otherwise exceed the specifications of the power source. For example, a Universal Serial Bus (USB) interface may only be specified to provide 500 mA (milliamperes) of current and charging both batteries simultaneously may exceed that limit. Drawing too much current from a power source may damage the power source, may damage the device that hosts the power source (i.e., the computer in which a USB port is located), may cause the power source to overheat, or may cause the power source or host device to enter a failsafe mode which discontinues power until the power source or host device is reset and/or rebooted.

In some cases, electronic devices such as tablets and smartphones are used as mobile point of sale (POS) terminals. Peripheral devices, such as a bar code scanner, are sometimes attached to the electronic device to perform all of the necessary POS functions. When using an electronic device as a mobile POS device, multiple challenges exist. First, battery power limitations may limit how long the device can be used before recharging. Second, the peripherals may cause additional power management challenges. Third, the electronic device may be difficult to handle or carry while performing other functions, resulting in a risk of dropping or breakage. Fourth, the electronic device may be difficult to hold and operate with one hand. Fifth, the peripherals may be difficult to handle, carry, and/or operate in conjunction with the electronic device.

SUMMARY

In one embodiment, a case for an electronic device is provided. The case includes a front shell, a back shell attachable to the front shell, a battery, a payment device reader, a product information input device, and electrical circuitry. At least one electromechanical button is attached to the case and is electrically connected to the one or more of the payment device reader, and the product information input device. The case can also include a trigger member attached to the case that can actuate the electromechanical button. The case may include a computer processor that executes the instructions to communicate with the electronic device, limit an amount of current of the received electrical power consumed by the case, allocate the amount of current among the battery and the electronic device based on the communications, read product information from a product using the product information input device, and read a payment device using the payment device reader, where the payment device is used to pay for the product.

In one embodiment, the case includes a hand strap attached to a rotatable mount that allows the user to hold and maneuver the case with one hand. This feature frees the user's second hand to accomplish other tasks simultaneously, such as operating the electronic device, operating the payment device reader, or operating the product information input device. To further enhance ease of use, one embodiment of the case includes a shoulder strap.

Embodiments introduced herein also include other methods, systems with various components, and non-transitory machine-readable storage media storing instructions that, when executed by one or more processors, direct the one or more processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Figure 2:
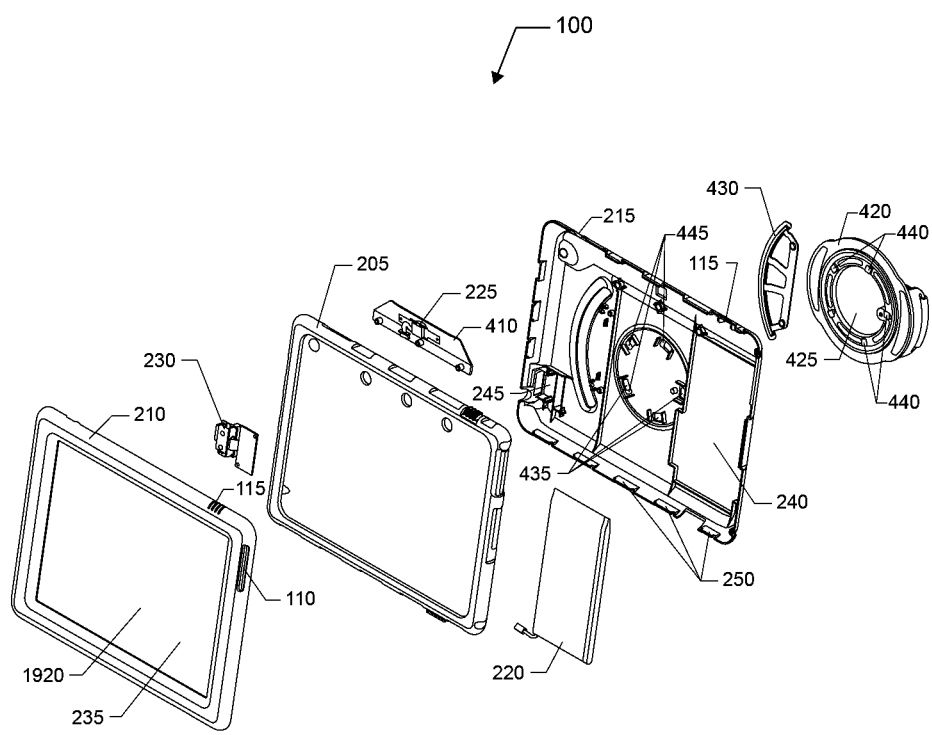
FIG. 2 shows an exploded front perspective view of an electronic device case for a mobile point of sale.

The terms "case" and "protective enclosure" are used interchangeably herein and are intended to have the same meaning throughout this specification. A protective enclosure 100 can surround and protect an electronic device. The protective enclosure can include a front shell 210 and a back shell 215 as shown in FIG. 2. The front shell 210 can cover at least a portion of a front surface of the electronic device 205, and the back shell 215 can cover at least a portion of a back surface of the electronic device. The protective enclosure can be made from any suitable material, such as polycarbonate, fiberglass filled nylon, aluminum, stainless steel, or carbon fiber.

Figure 5:
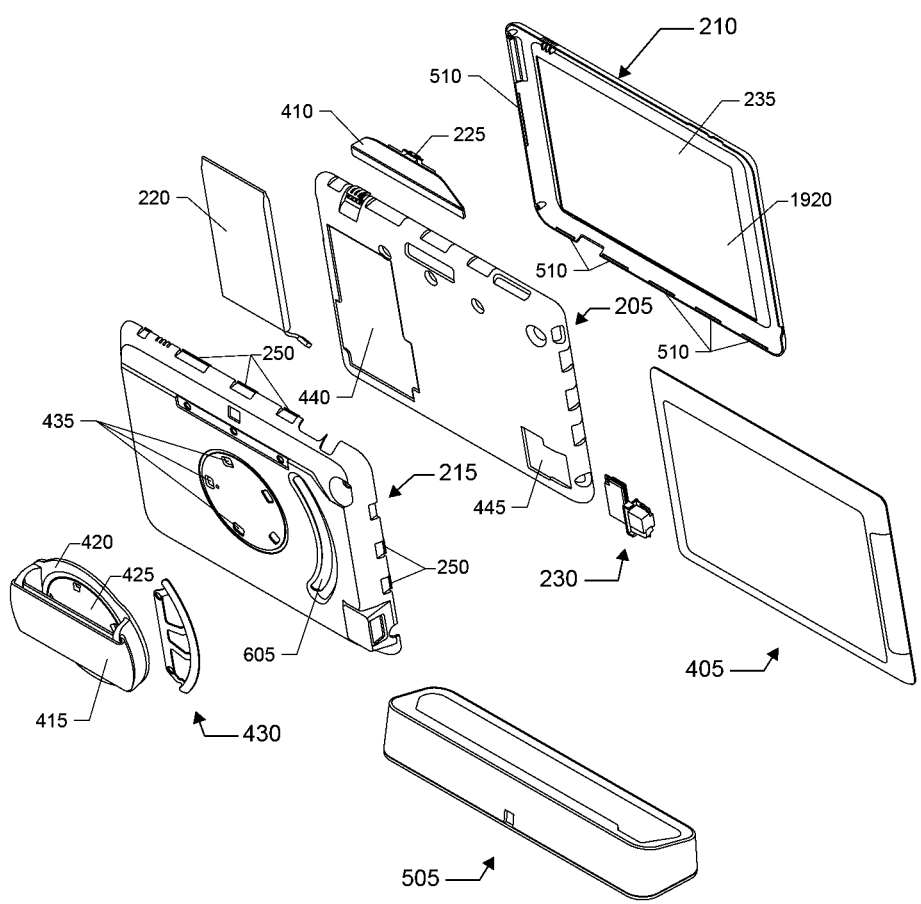
FIG. 5 shows an exploded rear perspective view of an electronic device case for a mobile point of sale along with a tablet computer and docking station.

The front shell 210 can attach to the back shell 215 in any suitable way. For example, the front shell 210 can attach to the back shell 215 with fasteners, adhesive, or retention features. Retention features can include a plurality of tabs 510 extending from front shell 210, as shown in FIG. 5. The plurality of tabs can be configured to mate with a plurality of slots 250 in the back shell 215, as shown in FIG. 2. Alternately, a plurality of tabs in the back shell 215 can be configured to mate with a plurality of slots in the front shell 210.

The protective enclosure 100 can be made using any suitable manufacturing process, such as injection molding. In one example, the protective enclosure 100 can include overmolded portions to protect the electronic device from drops, provide improved feel and grip for a user, or provide additional friction to prevent the enclosure from sliding on smooth surfaces, such as store counters. In an overmolding process, such as insert molding or multi-shot molding, a first material can be molded onto a second material. In one example, the first material can be a thermoplastic elastomer (TPE) and the second material can be a rigid plastic, such as polycarbonate. As a result of the overmolding process, the overmolded first material can form a strong bond with the second material. The use of primers or adhesives in the overmolding process may not be required to achieve a suitable bond between the first and second materials.

Figure 4:
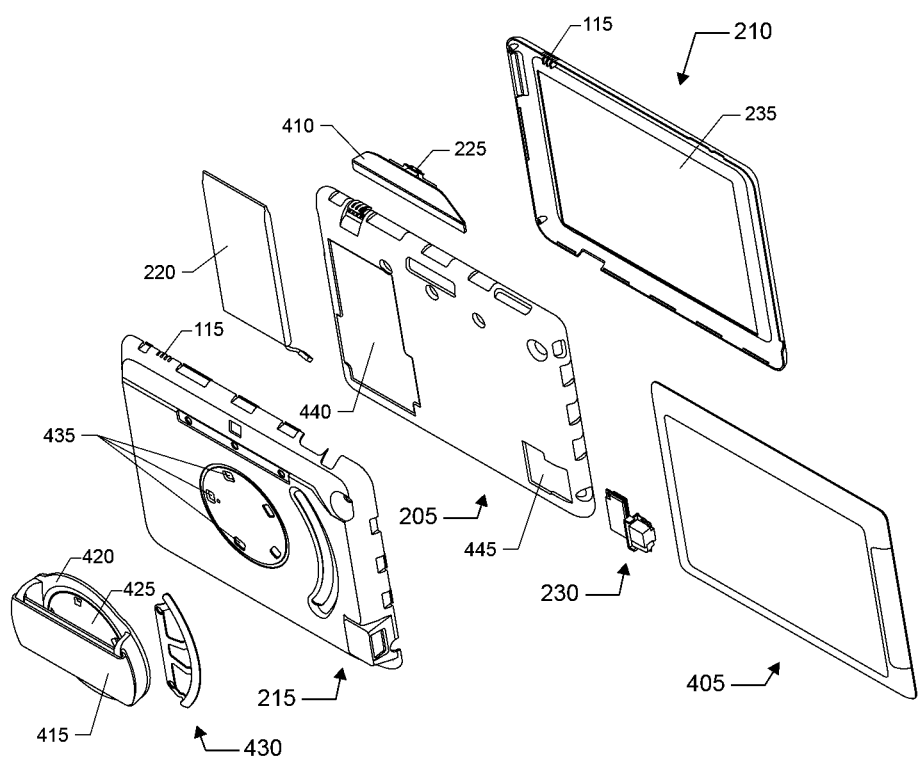
FIG. 4 shows an exploded rear perspective view of an electronic device case for a mobile point of sale along with a tablet computer.
Figure 6:
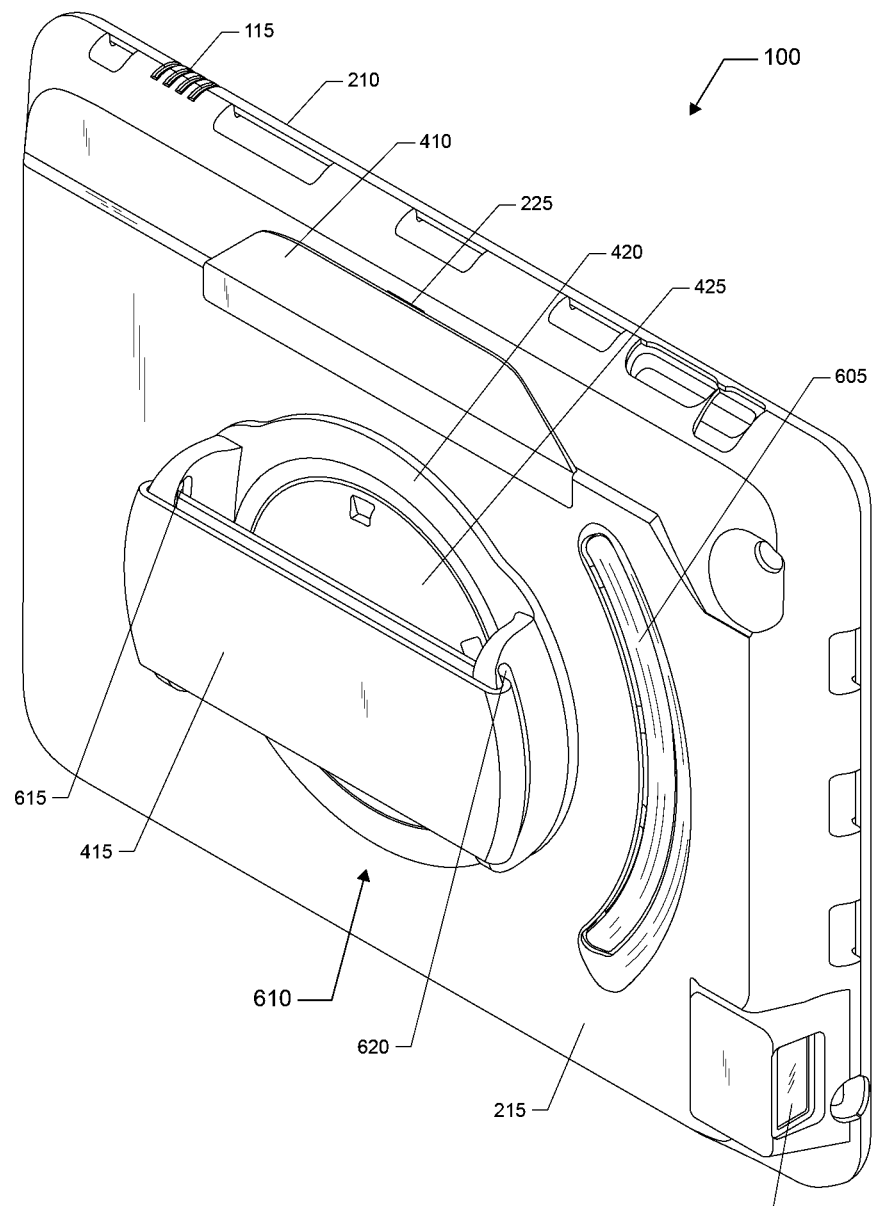
FIG. 6 shows a rear perspective view of an electronic device case for a mobile point of sale.
Figure 7:
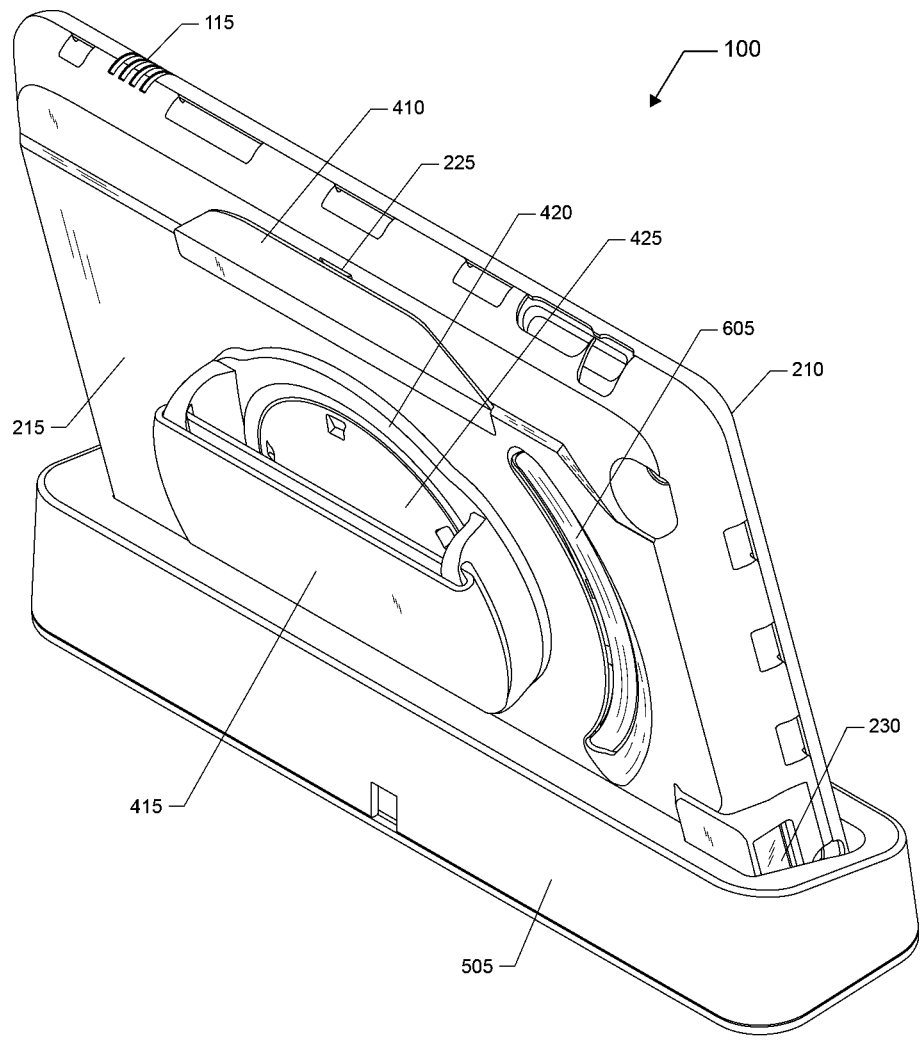
FIG. 7 shows a rear perspective view of an electronic device case for a mobile point of sale positioned in a docking station.
Figure 8:
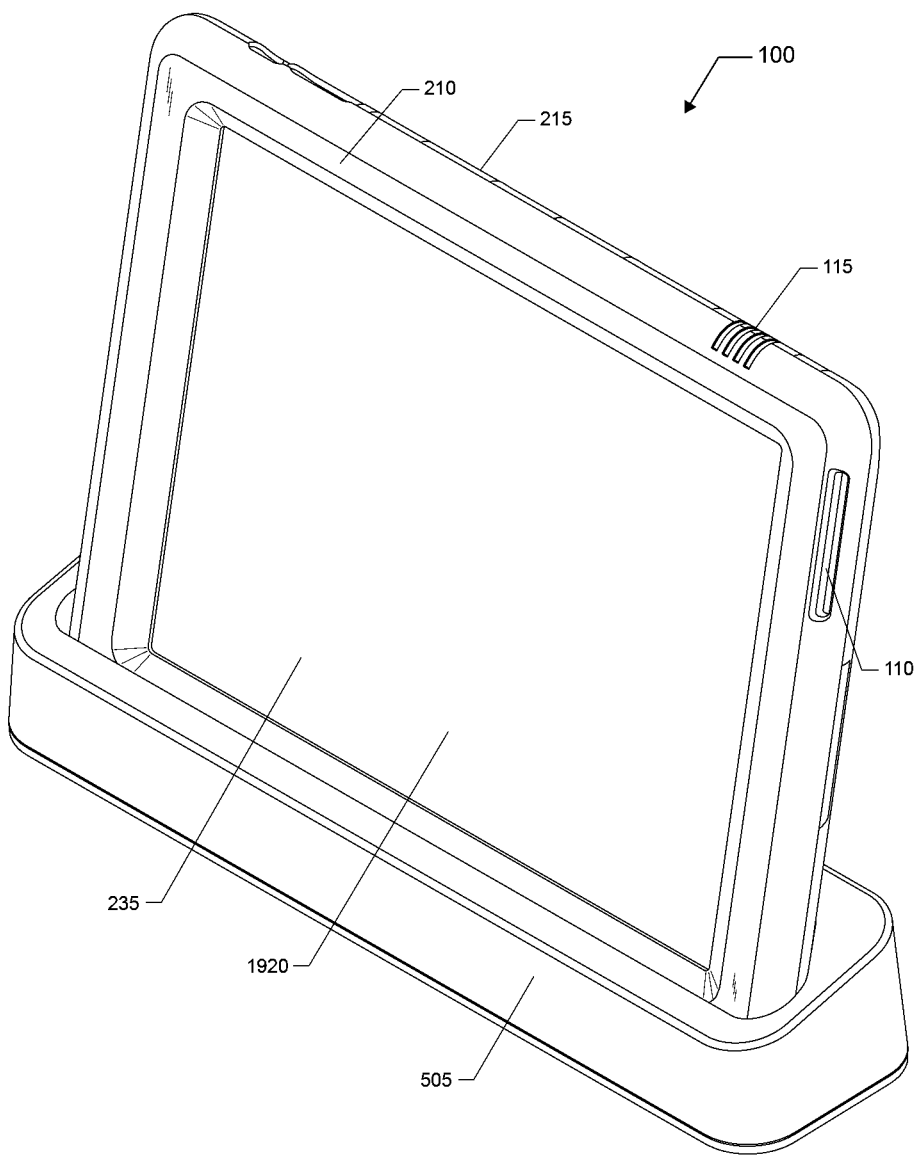
FIG. 8 shows a front perspective view of an electronic device case for a mobile point of sale positioned in a docking station.

The protective enclosure 100 can include data input devices to allow the electronic device to serve as a mobile point of sale. The data input devices can allow the electronic device 405 to perform a variety of mobile transactions or tasks, such as retail transactions or inventory-related tasks. The data input devices can include a payment device reader and a product information input device. In one example, the product information input device can be a bar code reader 230, as shown in FIGS. 4 and 6. The bar code reader 230 can be attached to the protective enclosure 100 in any suitable way or can be detachable from the protective enclosure 100. In one example, the bar code reader 230 can be mounted to the back shell 215 in a bar code reader bay 245 as shown in FIG. 2. The bar code reader 230 can be attached to the back shell 215 using fasteners or can snap into the bar code reader bay 245 using retention features to simplify assembly.

Figure 14:
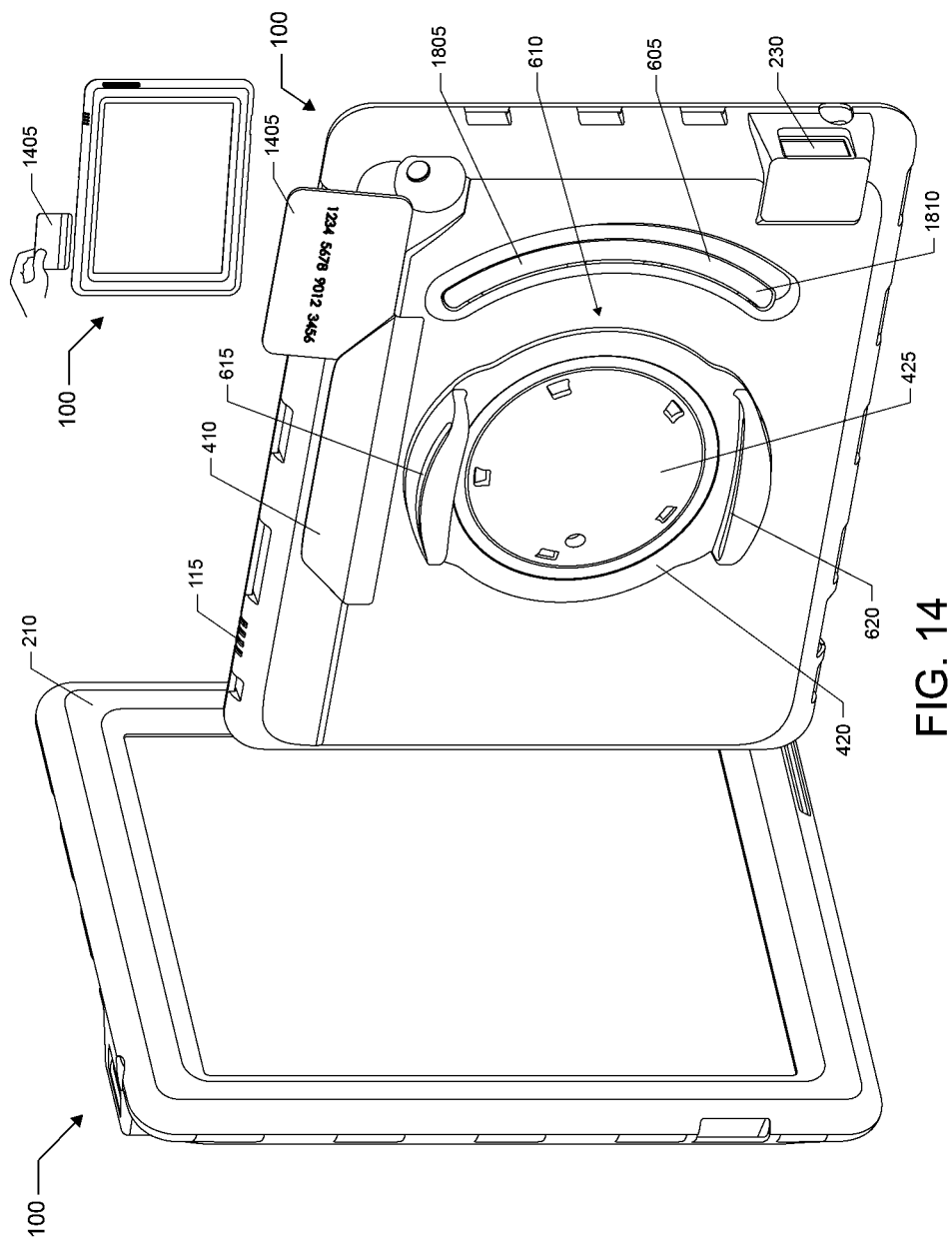
FIG. 14 shows a rear perspective view of a credit card being swiped through a card runway of the case.

In one example, the payment device reader can be a magnetic card reader 225, as shown in FIG. 2. The magnetic card reader 225 can be mounted to the protective enclosure 100 in any suitable way. In one example, as shown in FIGS. 2, 6 and 14, the magnetic card reader 225 can be mounted to a card runway 410 that is mounted on an outer surface of the protective enclosure 100. The card runway 410 can be mounted flush with a back surface of the back shell 215 of the protective enclosure 100.

The protective enclosure 100 can include a flexible insert 205 that surrounds at least a portion of the electronic device 405 and protects the electronic device. The flexible insert 205 can be positioned between the electronic device 405 and the front and back shells (210, 215). The flexible insert 205 can provide cushioning to the electronic device 405 during regular use or in the event of an accident. For example, the flexible insert 205 can absorb shocks resulting from dropping the electronic device 405 onto a hard surface. The flexible insert 205 can be made from any suitable material, such as, for example, foam material, silicone rubber, fabric, or thermoplastic elastomer. Any suitable type of foam can be used for the flexible insert 205, including open-cell polyurethane or closed-cell polyethylene. Likewise, any suitable type of fabric can be used for the flexible insert 205, including synthetic, natural, or semi-synthetic fabrics.

The flexible insert 205 can be configured to cover at least a back portion and at least a front portion of the electronic device 405. The flexible insert 205 can be configured to wrap around the edges of the electronic device 405 to prevent the device from directly contacting the front or back shells (210, 215) of the protective enclosure 100. Such a configuration can prevent impact forces from being transferred directly from the front or back shells (210, 215) to the electronic device 405. Also, preventing the electronic device 405 from directly contacting the front or back shells (210, 215) can prevent the inner surfaces of the shells from scratching the outer surfaces of the electronic device 405.

The flexible insert 205 can have any suitable thickness to provide adequate protection to the electronic device 405. In one example, the electronic device 405 can be a tablet computer, such as an APPLE IPAD, and the flexible insert 205 can be a foam material with a thickness of about 0.125 to 0.75, 0.125 to 0.5, 0.125 to 0.375, or 0.125 to 0.25.

The flexible insert 205 can include openings to accommodate various connectors, components, and fasteners within the protective enclosure 100, as shown in FIG. 4. The flexible insert 205 can include a battery opening 440 to accommodate a battery 220 positioned between an inner surface of the back shell 215 and the electronic device 405. In another example, the flexible insert 205 can include a bar code reader opening 445 to accommodate a bar code reader 230 between the back shell 215 and the electronic device 405. These openings (e.g. 440, 445) can provide clearance volumes between the back shell 215 and the protective case 405 to house various components. In addition, the perimeter of each opening (e.g. 440, 445) can provide cushioning to a component positioned in the opening. For example, the perimeter of the bar code reader opening 445 can provide cushioning to the bar code reader 230, thereby protecting the bar code reader 230 during a drop and potentially extending its useful life.

Materials with high impact absorption properties, such as fabric, rubber or foam materials, often have low thermal conductivities. Under certain circumstances, encapsulating an electronic device 405 in a material having a low thermal conductivity can result in overheating of the electronic device or decreased battery performance. To avoid these issues, the flexible insert 205 can be made of, at least partially, a material having a high thermal conductivity to prevent the electronic device 405 or components (e.g. 220, 230) within the protective enclosure from overheating. For instance, the flexible insert 205 can be made from a material having a thermal conductivity greater than 0.5, 1, 10, 25, 50, or 100 W/(m−K) at standard temperature. In one example, the entire flexible insert 205 can be made from a material having a high thermal conductivity. In another example, at least a portion of the flexible insert 205 can be made from a material having a high thermal conductivity. Thermally conductive portions of the flexible insert 205 can be thermally connected to a heat dissipation device, such as a fin structure, located on an outer surface of the protective enclosure. In another example, the thermally conductive portions of the flexible insert 205 can be thermally connected to the inner surface of the back shell that can be made from a material with a high thermal conductivity, such as aluminum. In this example, convective or conductive cooling can provide heat dissipation from the outer surface of the protective enclosure.

The protective enclosure 100 can include a heat dissipation device that is not part of the flexible insert 205. For example, the protective enclosure 100 can include one or more heat sinks placed in physical contact with an outer surface of the electronic device 405, the battery 220, or any of the electrical components (e.g. 230) housed in the protective enclosure. In one example, the heat sinks can be thermally connected to heat dissipation devices, which can include fin structures located on an outer surface of the protective enclosure 100. The heat sinks can be made from any material having a suitable thermal conductivity, such as a material having a thermal conductivity greater than 0.5, 1, 10, 25, 50, or 100 W/(m–K) at standard temperature. The heat sinks can transfer heat from the electronic device 405 or components of the protective enclosure 100 and transfer that heat to the heat dissipation devices where it can be transferred to the surrounding atmosphere.

To prevent the heat dissipation device from also transferring impact forces from the outer surface of the protective enclosure to the electronic device 405 or components (e.g. 220, 230) in the event of a drop, it can be desirable to make thermal pathways that are non-rigid. A thermal pathway can connect a heat sink that is in physical contact with the electronic device to a fin structure located on a back surface of the back shell 215. In one example, the thermal pathway can be made from a thermally conductive tape that has a suitable cross-sectional area to provide adequate heat transfer rates while also having sufficient flexibility to avoid transferring impact forces to the electronic device. The thermally conductive tape can have a cross-sectional area of greater than 1.0, 2, 10, or 20 mm$^2$.

The protective enclosure can include air channels (not shown) to provide cooling for the electronic device 405. In one example, air channels can be formed in the flexible insert 205 to allow for dissipation of heat from the electronic device 405 or other components within the protective enclosure. The air channels can extend from an outer surface of the electronic device 405 to an outer surface of the back shell 215 or the front shell 210. In one example, the back shell can include one or more openings to permit airflow to and from the electronic device 405 through the air channels. The one or more openings can include covers, such as mesh covers to prevent debris from entering the air channels.

In one example, the protective enclosure can include a fan (not shown) to provide forced convection through the air channels to increase the rate of heat dissipation. The fan can be mounted within the protective enclosure 100 and can be controllable. For instance, the fan can be turned on when the temperature within the protective enclosure 100 or the temperature of the electronic device 405 reaches a predetermined temperature. The protective enclosure can 100 include a temperature measurement device or can rely on a built-in temperature measurement device in the electronic device 405 to determine temperature. When a temperature exceeds the predetermined temperature, the fan can be turned on. Since the fan will consume power from the battery, it may only be desirable to turn on the fan under certain circumstances. For example, the fan may turn on when the power conserved by reducing the operating temperature of the electronic device 405 or the battery 220 will exceed the amount of power consumed by the fan. In one example, the user can be prompted with a warning regarding high operating temperature and can choose to activate the fan, increase the predetermined temperature, or turn off the electronic device and permit it to cool without operating the fan.

The protective enclosure 100 can include a hand strap 415, as shown in FIG. 6. The hand strap 415 can allow the user to hold and maneuver the protective enclosure 100 with one hand. Since the user can hold the protective enclosure 100 with one hand, the user has free use of their second hand to accomplish other tasks simultaneously, such as operating the touch screen 335 of the electronic device 405, swiping a credit card 1405 through the card runway 410 (shown in FIG. 14), or operating the bar code reader 230. The hand strap 415 can be attached to a rotatable mount 610 that allows the hand strap 415 to rotate relative to the protective enclosure 100.

The rotatable mount 610 can attach to the protective enclosure 100 in any suitable way. In one example, the rotatable mount 610 can include a first mount portion 425 and a second mount portion 420, as shown in FIG. 6. The first mount portion 425 can have a circular perimeter and can mount to the back shell 215 of the protective enclosure 100. The second mount portion 420 can be rotatably captured between the first mount portion 425 and the back shell 215. The first mount portion 425 can include a plurality of teeth 440 that extend into a plurality of slots 435 in the back shell 215, as shown in FIG. 2. Once the plurality of teeth 440 have been inserted into the plurality of slots 435, a partial rotation (in a first direction) of the first mount portion 425 can lock the plurality of teeth 440 into a plurality of retention features 445 on an inner surface 450 of the back shell 215. The plurality of retention features 445 can be integrated into the plurality of slots 435, as shown in FIG. 2. For instance, the plurality of retention features 445 can each include a sloped surface that engages with a tooth and results in increasing friction between the tooth 440 and the retention feature as the angle of rotation of the first mount portion 420 is increased during installation. At a certain angle of rotation, the friction between the teeth and the retention features is sufficient to lock the first mount portion 425 to the back shell 215. To prevent decoupling of the teeth from the retention features, a fastener can be used to prevent rotation of the first mount portion 425 relative to the back shell 215.

Rotation of the first mount portion 425 in a second direction opposite the first direction can release the plurality of teeth 440 form the plurality of retention features 445 and allow the first mount portion 420, and the entire rotatable mount 610, to be removed from the protective enclosure 100. By removing the rotatable mount 610, the back surface of the protective enclosure 100 can become substantially flat. This can allow the protective enclosure to rest flush against a surface, such as a store counter, which may be preferable for some users. Removing the rotatable mount 610 can expose the plurality of slots 435 in the back shell 215. To improve aesthetics of the protective enclosure 100, and to prevent liquid or debris from entering the protective enclosure through the plurality of slots 435, the slots can be sealed with a suitable slot cover. In one example, the slot cover can be positioned on an inner surface of the back shell 215 and can include protrusions that extend into the plurality of slots 435 and are flush with a back surface of the protective enclosure 100.

Any suitable method can be used to attach the rotatable mount 610 to the protective enclosure 100. For instance, fasteners, such as screws, VELCRO, or snaps can be used to secure the rotatable mount 610 to the back shell 215. These fasteners can be used in addition to the plurality of teeth and the retention features described above or can be alternate method of attaching the rotatable mount 610 to the protective enclosure 100.

Figure 18:
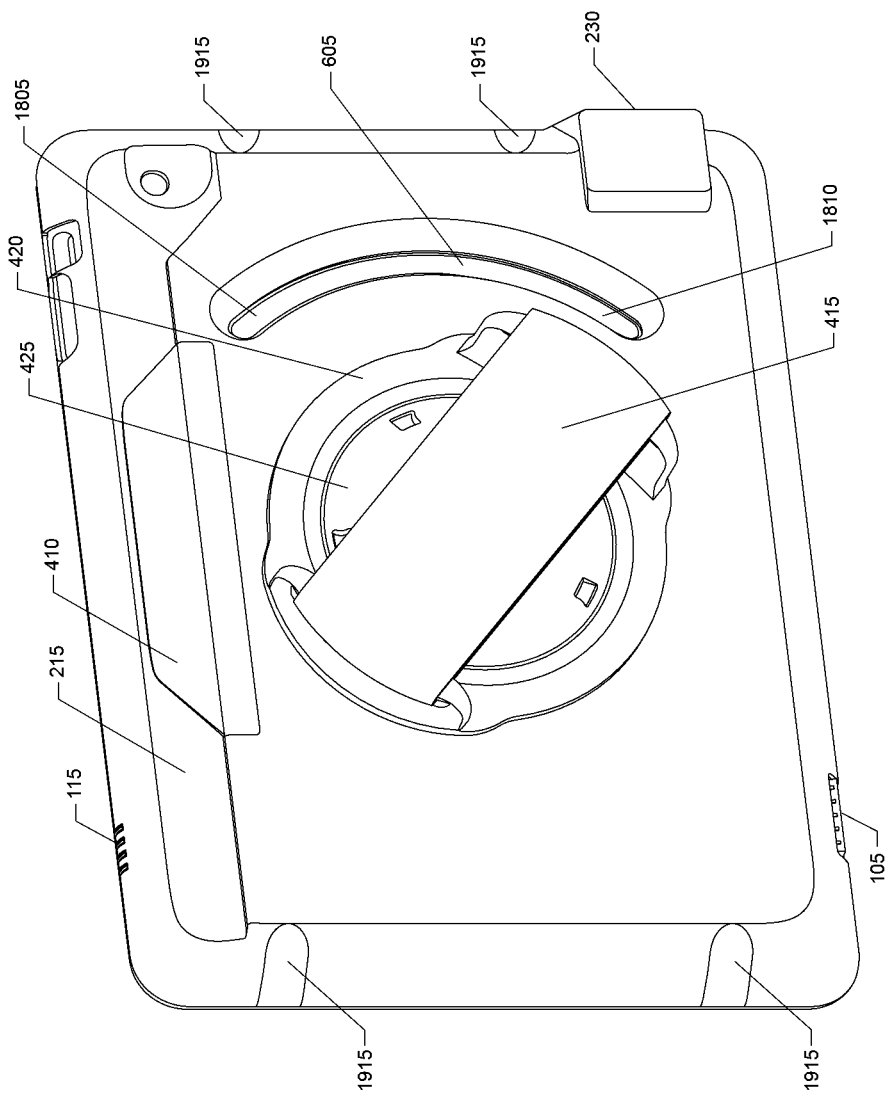
FIG. 18 shows a rear perspective view of an electronic device case for a mobile point of sale.
Figure 19:
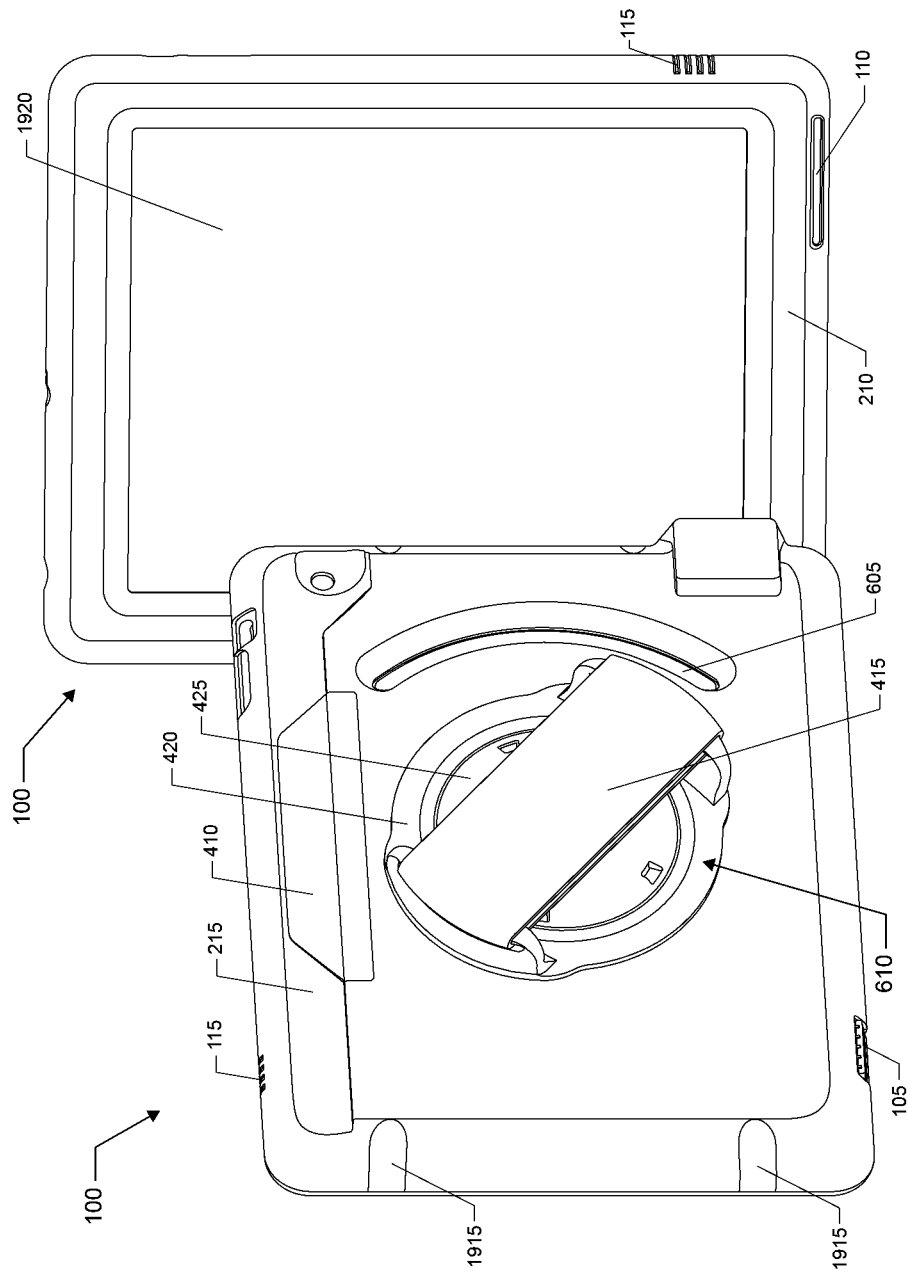
FIG. 19 shows a rear and front perspective view of an electronic device case for a mobile point of sale.

The second mount portion 420 can be rotatably captured between the first mount portion 425 and the back shell 215. Consequently, the second mount portion 420 can rotate independently of the first mount portion 425 and the back shell 215. As shown in FIGS. 18 and 19, the second mount portion 420 can rotate across a range of angular positions. The second mount portion 420 can include a first opening 615 and a second opening 620 that are configured to receive the hand strap 415. The hand strap 415 can attach to the first and second openings (615, 620) by any suitable method. In one example, the hand strap 415 can be fed through the first opening 615 and the second opening 620 and can be looped back and secured to itself by stitching or adhesive. A hand slot can be formed between the hand strap 415 and the first mount portion 425, and the hand slot can be any suitable size to receive a user's hand with the user's palm resting against the first mount portion 425. In one example, the hand strap 415 can be adjustable to alter the size of the hand slot to accommodate various hand sizes. In another example, the hand strap 415 can be made of elastic to create a one-size-fits-all hand slot.

To allow the user to easily remove the rotatable mount 610 without special tools, the first mount portion 425 can include a ring gear extending partially or fully around an outer cylindrical surface of the first mount portion. In addition, the second mount portion 420 can include an internal ring gear extending partially or fully around an inner cylindrical surface of the thru hole in the second mount portion, where the thru hole is configured to receive the first mount portion 425 when the first and second mount portions (425, 420) are assembled to the case 100. When the first and second mount portions (425, 420) are assembled to the back shell 215 of the case 100, there may be a radial clearance distance between the internal ring gear and the external ring gear. The radial clearance distance between the internal ring gear and the external ring gear can allow the second mount portion 420 to rotate freely when the first and second mount portions (425, 420) are assembled to the back shell 215. The radial clearance distance between the internal ring gear and the external ring gear can have any suitable value, and should account for manufacturing tolerances, assembly tolerances, and a desire for the second mount portion 425 to rotate freely from the first mount portion 420 during normal use. In certain examples, the radial clearance distance between the internal ring gear and the external ring gear can be about 0.005-0.100, 0.005-0.05, 0.010-0.05, or 0.010-0.020 inches. As shown in FIG. 6, the second mount portion 420 can include a first upright portion that includes the first opening 615 and a second upright portion that includes the second opening 620. By applying a clamping force to the first and second uprights of the second mount portion 420, such as by squeezing the first and second upright portions between a thumb and forefinger, where the thumb presses against an outer wall of the first upright and the forefinger presses against an outer wall of the second upright, the user can deflect the first and second uprights of the second mounting portion 420 inward toward each other. As a result, the thru hole in the second mount portion 420 will become eccentric as the diameter of the thru hole between the first and second uprights decreases, and the internal ring gear on the second mounting portion will be urged inward to a point where the internal ring gear engages with the external ring gear on the first mount portion 425. The user can then rotate the second mount portion 425, which will cause the first mount portion 420 to rotate due to engagement between the internal ring gear and the external ring gear. This rotation of the first mount portion 425 will release the plurality of teeth 440 from the plurality of retention features 445, and allow the first mount portion 420, and the entire rotatable mount 610, to be removed from the protective enclosure 100. This feature allows the user to easily remove the rotatable mount without need for special tools. This can be especially useful in commercial settings where the user may not have access to special tools or may not be comfortable using special tools.

The internal ring gear on the second mount portion 425 can include any suitable feature or features that allow it to transmit torque to the external ring gear on the first mount portion 420. In one example, the internal ring gear can include one or more teeth that are configured to engage one or more teeth on the external ring gear to transmit torque applied by the user to the second mount portion 425. The teeth on the internal and external ring gears can have any suitable shape, including triangular, square, curved, or any combination thereof.

Figure 15:
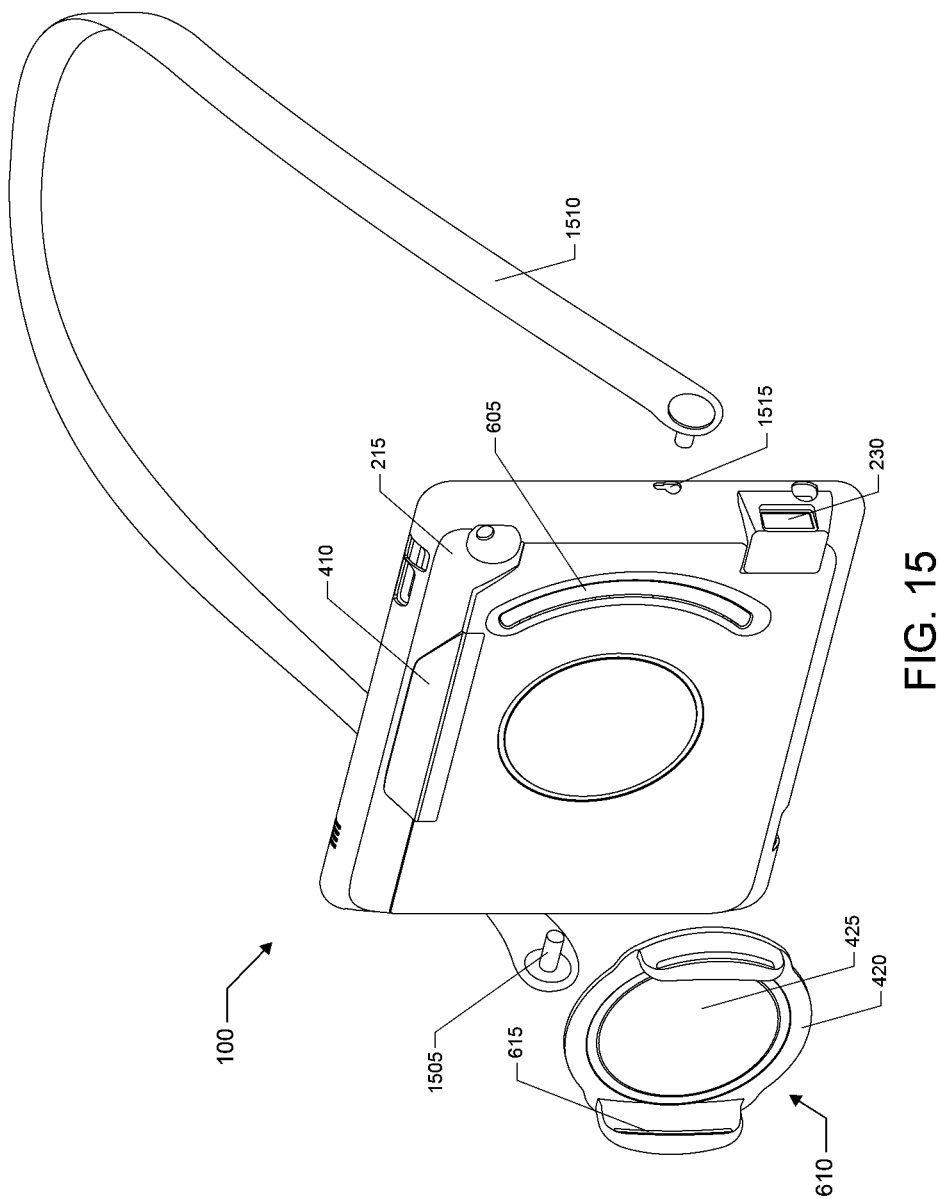
FIG. 15 shows a rear perspective view of an electronic device case with a shoulder strap and rotatable mount without a hand strap.
Figure 16:
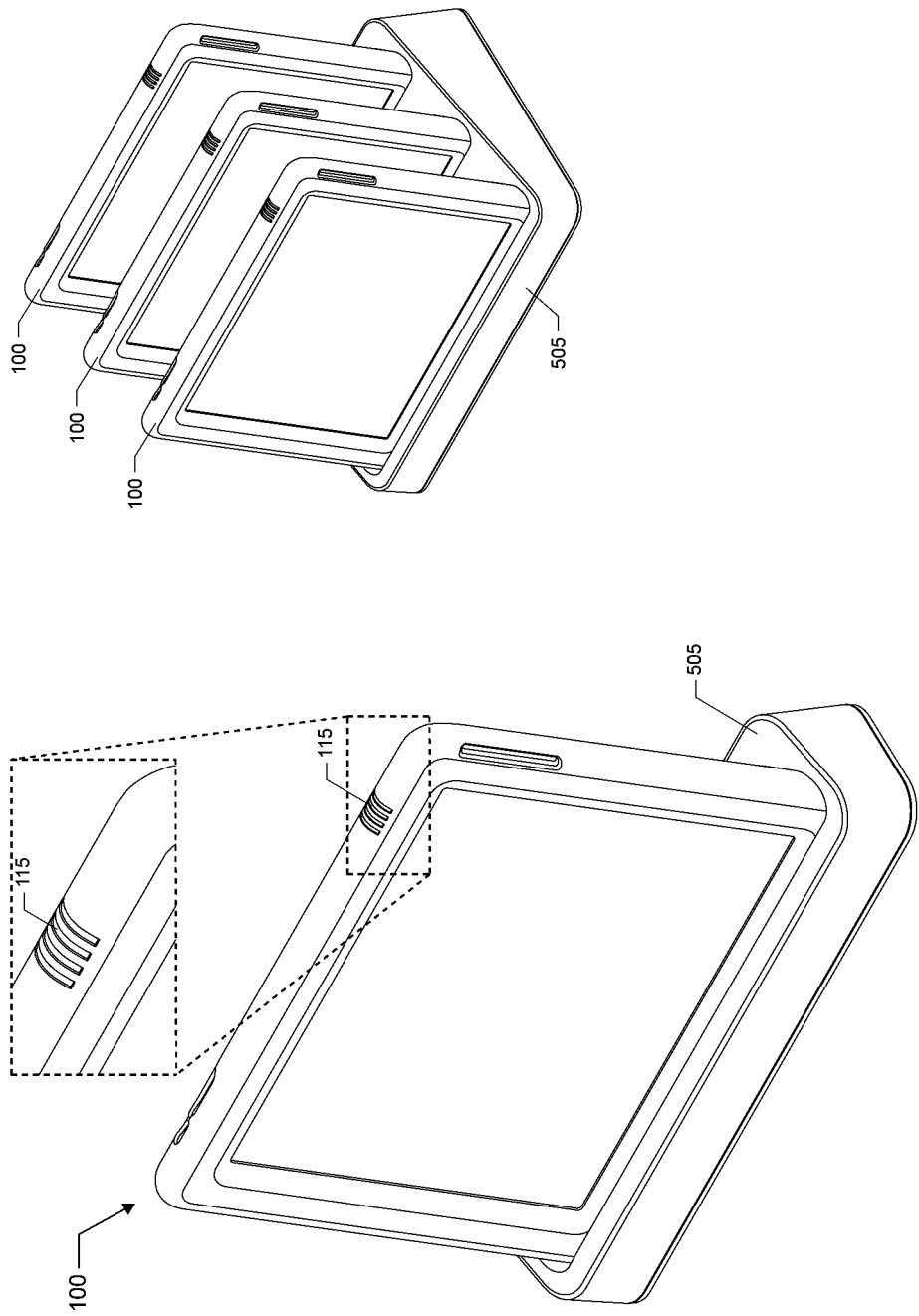
FIG. 16 shows an electronic device case in a single-bay docking station and a plurality of electronic device cases in a multi-bay docking station.
Figure 17:
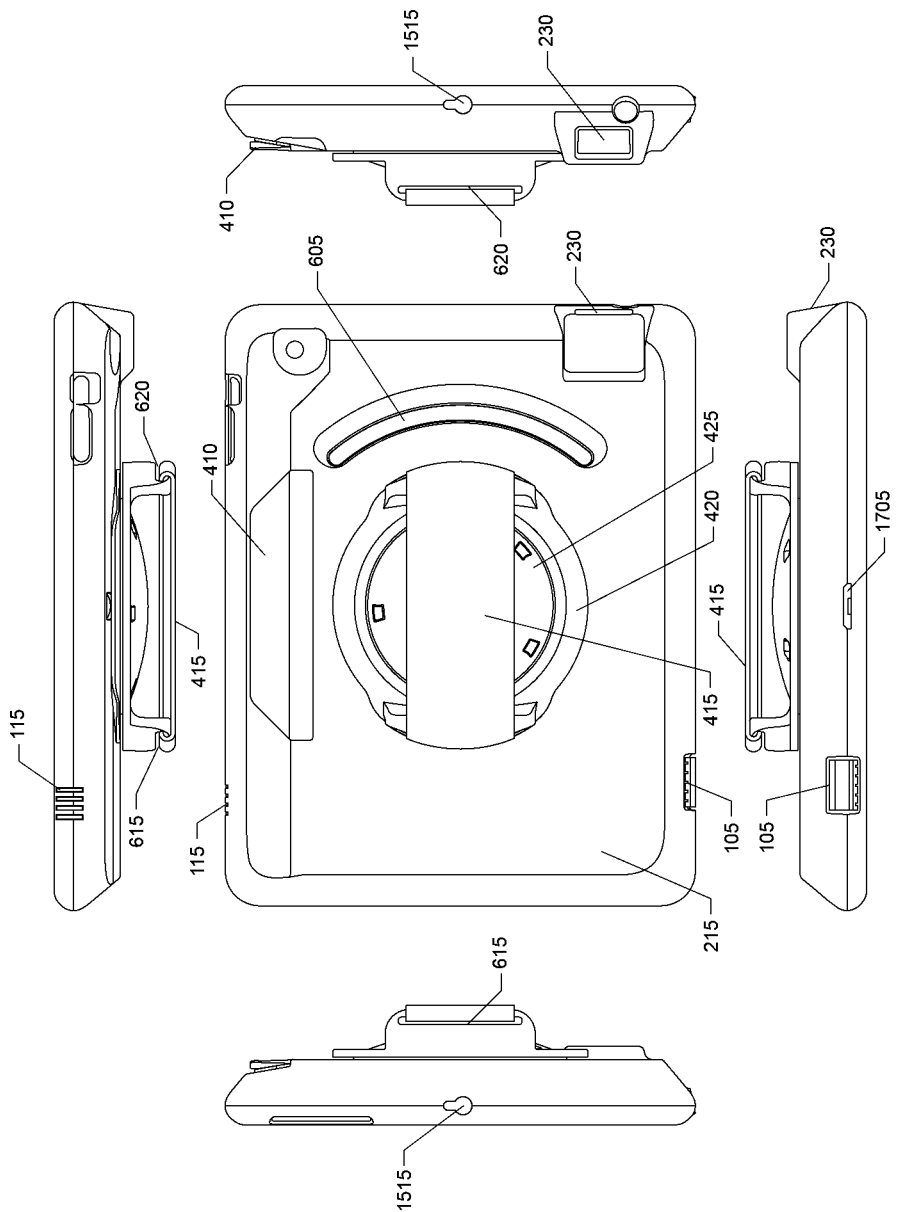
FIG. 17 shows a rear view and projected views of an electronic device case for a mobile point of sale.

The protective enclosure 100 can include a shoulder strap to reduce fatigue of a user's arm caused by weight of the mobile point of sale. The shoulder strap can attach to the protective enclosure 100 using any suitable form of attachment. For example, the shoulder strap 1510 can attach to the protective enclosure 100 using fasteners 1505, as shown in FIG. 15. The fasteners 1505 can be buttons or snaps that allow for easy attachment and removal. The fasteners 1505 can attach to the enclosure at various attachment points. The attachment points can allow the fasteners 1505 to swivel with respect to the protective enclosure 100. In one example, the attachment points 1515 can be located near the middle of the side surface of the protective enclosure, as shown in FIG. 15. This configuration can allow the user to easily rotate the display screen of the electronic device toward or away from their body depending on desired usage. In another example shown in FIG. 19, the attachment points 1915 can be located near the ends of the side surface of the protective enclosure to allow for additional usage options.

Figure 3:
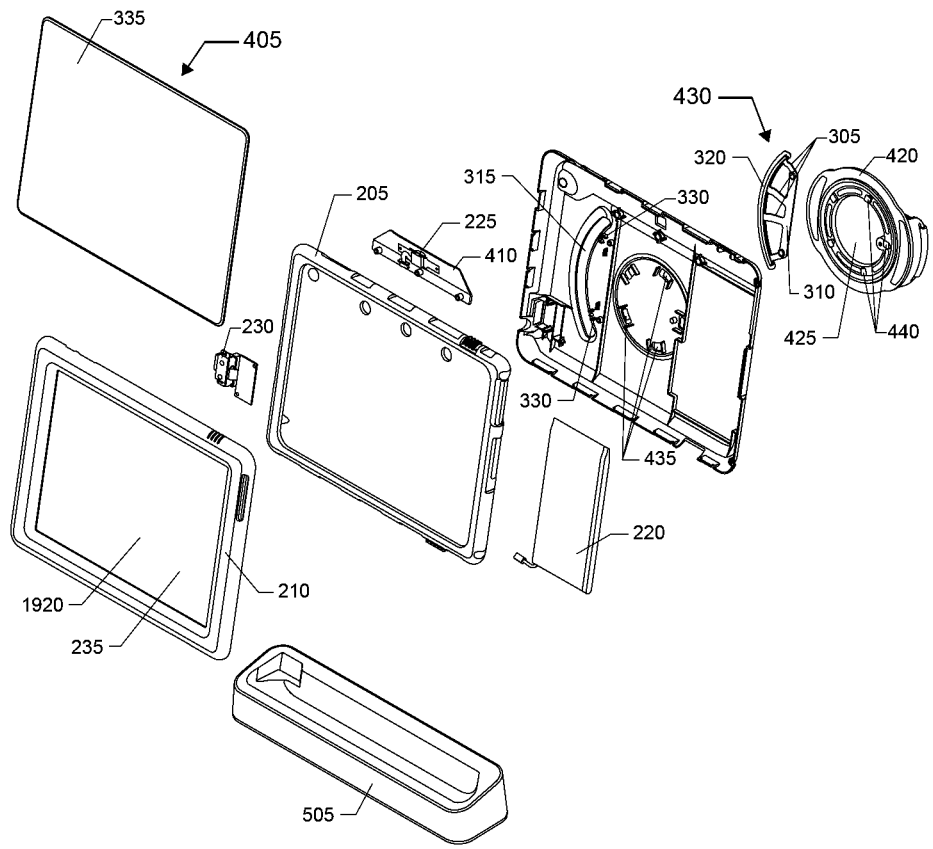
FIG. 3 shows an exploded front perspective view of an electronic device case for a mobile point of sale along with a tablet computer and docking station.

The protective enclosure 100 can include a trigger 605 that can be configured to activate various features of the protective enclosure. In one example, the trigger 605 can be a trigger with an arcuate shape, as shown in FIG. 6. The trigger can be configured to activate any of the data input devices. For instance, depressing the trigger 605 can activate the bar code reader 230 or the credit card reader 225, as shown in FIG. 3. Having an arcuate trigger 605 can allow all portions of the trigger 605 to be equidistant from the point of rotation of the rotatable mount 610, which can allow the user to easily activate the trigger 605 across a range of angular positions of the rotatable mount. For example, the user may switch between a landscape mode and a portrait mode within the electronic device 405 simply by rotating the rotatable mount 610. Even as the user's hand position changes relative to the back shell 215 of the protective enclosure 100, at least one of the user's fingers can remain near the trigger 605 to permit actuation of the trigger. Likewise, if the protective enclosure 100 is swapped between a user's right hand and left hand, at least one of the user's fingers can remain near the trigger 605 to permit actuation of the trigger.

The protective enclosure 100 can include a trigger member 430, as shown in FIG. 3. The trigger member 430 can include a base portion 310 that can be firmly secured to an inner surface of the back shell 215 using, for example, fasteners. The trigger member 430 can include a plurality of fingers 305 extending from the base portion 310 and connecting to an arcuate portion 320 of the trigger member 430. The arcuate portion 320 of the trigger member 430 can be located proximate an inner surface 315 of the trigger 605. The inner surface 315 of the trigger 605 can be opposite the outer surface of the trigger where the user's fingers contact the trigger 605. Depressing the trigger 605 inwardly toward the electronic device 405 can cause the arcuate portion 320 of the trigger member 430 to deflect relative to the back shell 215 of the protective enclosure. As a result, the arcuate portion 320 of the trigger member 430 may deflect a suitable distance to actuate a button (not shown) mounted within the protective enclosure. Actuation of the button can be configured to cause a feature of the protective enclosure to become active, such as the bar code reader 230. In one example, the action elicited by actuation of the button can be user-selectable.

The protective enclosure 100 can include more than one button positioned near the trigger member 430. For example, buttons can be mounted on button mounts 330 on an inner surface of the protective enclosure. Depressing the trigger 605 at certain positions along its length can result in actuation of certain buttons. For example, depressing a first portion 1805 of the trigger, such as a left portion, can actuate a first button and depressing a second portion 1810 of the trigger, such as a right portion, can actuate a second button, as shown in FIG. 18. The first button can be used to scroll through a menu, and the second button can be used to select an option from the menu. For example, the first button can be used to scroll through a menu of payment options (e.g. debit or credit), and the second button can be used to select a payment option. This can allow the user to hold and operate the electronic device with a single hand, which frees their second hand for other tasks. Where the electronic device is a touch screen device, this feature can allow a gloved user to operate the electronic device 405 without removing their gloves. This can improve efficiency and safety. In a first example, a rental car employee working in a cold environment can check-in returning vehicles without removing their gloves, thereby increasing efficiency. In a second example, a hospital employee working in a sterile environment can take inventory of medical supplies without removing surgical gloves, thereby improving safety.

Where the protective enclosure 100 includes multiple buttons, the trigger member 430 can include several discrete portions instead of one continuous portion along the length of the trigger 605. Each discrete portion of the trigger member 430 can enhance performance of the trigger by ensuring that when one button is actuated, adjacent buttons are not actuated accidentally by unintended deflection of the trigger member.

Figure 1:
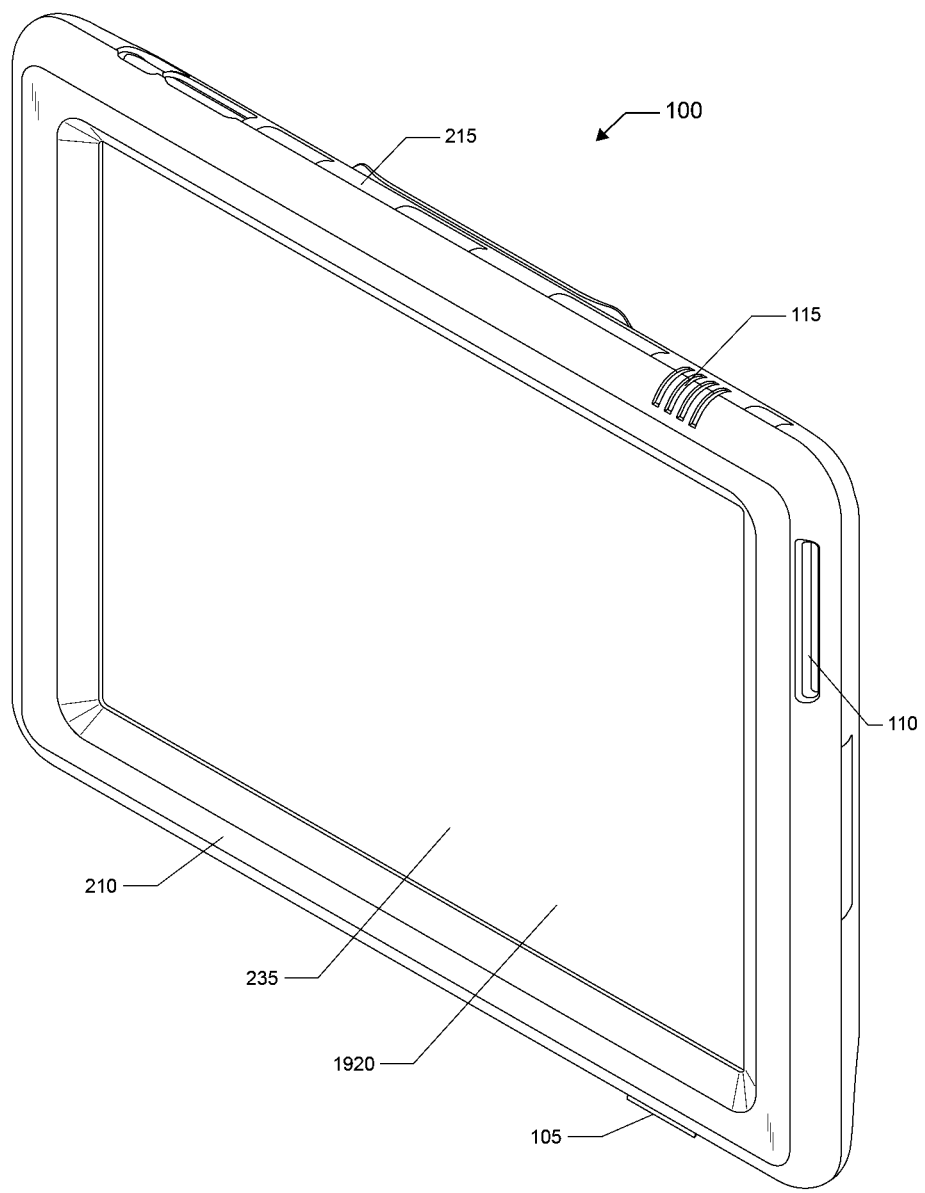
FIG. 1 shows a front perspective view of an electronic device case for a mobile point of sale.

The protective enclosure can include a flexible membrane 1920 to allow for operability of a touch screen 335 on the electronic device 405, as shown in FIGS. 1 and 19. For example, the front shell 210 can include a display opening 235 that is covered by the flexible membrane 1920. In one example, the flexible membrane 1920 can be made from a thin layer of polycarbonate (e.g. LEXAN), polyvinyl chloride (PVC), polyurethane, or silicone that can be molded, such as by thermoforming, casting, stretching, heating, or injection molding, or otherwise shaped to fit over the front surface of the electronic device 405 or other surfaces of the electronic device. The flexible membrane 1920 can have a thickness ranging from about 0.004 to 0.020 inches. The flexible membrane 1920 can be made from a single material or multiple materials that are welded, glued, or formed together into a single membrane. For a portion of the flexible membrane 1920 that is disposed over the touch screen 335 of the electronic device 405, it can be desirable to use a clear, thin layer of glass or plastic to provide a clear, transparent material over the screen to protect the screen from scratches while also permitting operability of the touch screen. If the electronic device 405 includes a keyboard, a portion of the flexible membrane that covers the keyboard can be made of a thin layer of polycarbonate (e.g. LEXAN), PVC, polyurethane, or silicone that is flexible so that the keyboard or other buttons can be pressed through the membrane, which can provide a similar feel as using the keyboard without the flexible membrane.

The protective enclosure can include a charge indicator 115. The charge indicator 115 can be located proximate an outer surface of the protective enclosure. As shown in FIG. 1, the charge indicator 115 can be a series of LEDs, and each LED can represent a percentage of charge remaining when illuminated. For example, if the charge remaining in the battery is less than 75 percent but greater than 50 percent, two out of four LEDs may be illuminated. The charge indicator 115 can display the charge remaining in the electronic device 405, battery 220, or both and can be selectable by the user.

The protective enclosure can include various openings to allow for operability of the electronic device 405 by the user. For example, the protective enclosure 100 can include an opening for a camera, camera flash, switch, volume control button, headphone jack, power button, or microphone of the electronic device 405. The microphone opening can be configured to avoid introducing echoes or reverberations into the sound waves that are received by the microphone of the electronic device 405. In another example, the protective enclosure 100 can include a speaker opening 110 to accommodate a speaker of the electronic device. The speaker opening 110 can redirect sound waves generated by the speaker located on a back or end surface of the electronic device upwardly at the user, thereby improving the directivity of the sound waves and making sound appear louder to the user. This can be desirable low-power speakers that are often included in mobile electronic devices.

Figure 9:
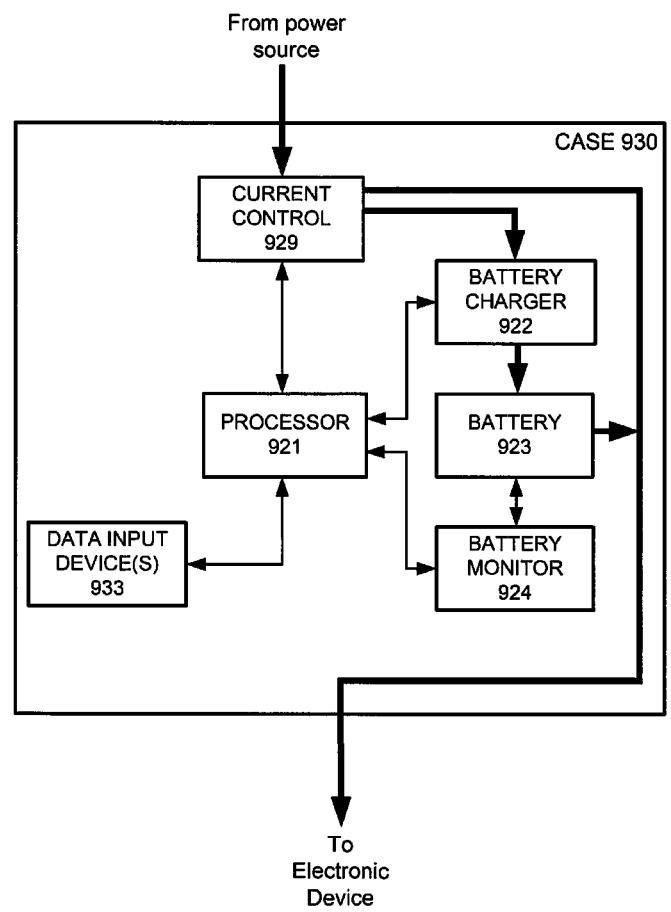
FIG. 9 illustrates a case for an electronic device with components for managing power in one embodiment of the techniques disclosed herein.

FIG. 9 illustrates case 930 for an electronic device with components for managing power in one embodiment of the techniques disclosed herein. Case 930 includes current control module 929, battery charger 922, case battery 923, battery monitor 924, data input device(s) 933, and processor 921. Back shell 215 is an example of case 930, although other configurations are possible. The illustrated elements of case 930 may be assembled on one or more circuit boards. Case 930 may also include mechanical components and functions as illustrated in FIGS. 1-8 and the accompanying explanations.

Processor 921 may be any type of microcontroller, microprocessor, microcomputer, programmable logic device, reconfigurable circuit, or application specific circuit that is configured to communicate with other elements of case 930 to perform the described power management functions. In some situations, these power management functions may be described as 'intelligent' power management functions.

In some configurations, processor 921 may also communicate with an electronic device to which case 930 is attached, communicate with a power source, communicate with other devices, or with combinations thereof. Electronic device 405 is one example of an electronic device with which processor 921 communicates. Processor 921 may make use of computer executable program instructions that are stored in processor 921. Alternately, the computer executable program instructions may be stored in a memory device that is separate from processor 921.

Battery 923 is a rechargeable battery for supplying power to a device to which case 930 is attached. Battery 923 may use one or more of a variety of battery technologies including lithium ion (Li-ion), lithium ion polymer (Li-ion polymer), lead-acid, nickel cadmium (NiCd), nickel metal hydride (NiMH), nickel-zinc, alkaline, or others. Battery 923 stores chemical energy which can be converted into electrical energy and can be provided to an electronic device, such as electronic device 405, to which case 930 is attached. Battery 220 is one example of battery 923.

Although additional batteries are possible, for purposes of simplifying the discussion herein, the examples provided are generally limited to examples of cases with a single battery and electronic devices with a single battery. However, the solutions and techniques disclosed herein may be implemented in a fundamentally similar manner when the case and/or the electronic device have two or more batteries.

Battery charger 922 is a device, or collection of devices, for charging battery 923 using current received from current control module 929. Battery charger 922 may charge battery 923 by transitioning through multiple charging phases such as conditioning, constant current, and constant voltage. The state of battery charger 922, charging characteristics, or a charge mode may be commanded or controlled by processor 921. Processor 921 may also monitor the status of charging or charge activities through communication with battery charger 922. Battery charger 922 may be capable of charging battery 923 using different charging algorithms (i.e., fast charge, slow charge, etc.). Battery charger 922 may also perform thermal management functions with respect to the charging activities.

Battery monitor 924 is a device or group of devices for monitoring a condition of one or more batteries such as battery 923. Battery monitor 924 may be a microcontroller peripheral that provides battery charge/fuel gauging functions. Battery monitor 924 may use one or more known algorithms for fuel gauging and may provide information related to various statistics such as remaining battery capacity, state-of-charge (i.e., percentage remaining), run-time to empty, battery voltage, and/or battery temperature. Battery monitor 924 may be configured for or commanded to provide some or all of these types of information to processor 921. In addition, battery monitor 924 may be capable of being configured for or commanded to these different modes by processor 921.

Current control module 929 is a device that can be configured for or commanded to limit or restrict the amount of current that is drawn from or flows from a power source attached to case 930. Current control module 929 may also be configured to control or limit the amount of current that flows from individual outputs of current control module 929, such as to an electronic device and to battery charger 922. Current control module 929 may be pre-programmed to perform these functions or may be configured for or commanded to perform these functions by processor 921. Current control module 929 may also include capabilities to measure or monitor the amount of current being used by various attached devices such as battery charger 922 and/or an attached electronic device. Current control module 929 may also limit surges of current when power is applied to or removed from case 930.

In one example of operation, processor 921 determines an amount of source current available from a power source providing power to case 930. While some power sources may be capable of supplying more power than they are specified to provide, drawing current from a power source beyond its specified capabilities may damage the power source or damage the device that is hosting the power source (i.e., a computer hosting a USB port from which power is being drawn). Determining how much current is available from a power source may be accomplished using one or more of several methods including: determining a type of the power source based on the type of connector used, determining a type of the power source based on information received about the power source, determining a type of the power source based on other characteristics of the power source, or determining the maximum capability of the power source through trial and error testing. Each of these four methods is discussed in detail below.

A first method for determining how much current is available from a power source is to use a default value based on the type of connector that is used to connect to the power source. For example, if the power is supplied to case 930 through a USB connector, processor 921 may use a default current limit of 500 mA for the current source. The power source may be treated as only being able to provide this amount of current, based on the connector type, even though the power source may actually be capable of providing higher levels of current.

A second method of determining how much current is available from a power source is to determine a type of the power source based on information or data received about the power source. For instance, processor 921 may receive information, through communication with the power source or another device, indicating that the power source is capable of supplying up to a specified maximum amount of current. Processor 921 then uses this information to direct current control module 929 to limit the total current drawn from the current source. The total current includes current used by battery charger 922, current used to operate other components of case 930, and current directed to an electronic device attached to case 930.

A third method of determining how much current is available from the power source is to determine a type of the power source based on a characteristic of the power source or information provided by the power source. The power source may communicate information about its identity or characteristics to case 930 or another host device. In the case of a power source connected using a USB connector, the data lines associated with the connector may not be otherwise used for delivering power and may be used to indicate capabilities of the power source. For example, APPLE chargers typically indicate the available current from the charger by applying specific voltages on the D+ and D− USB lines. When D+ and D− are both held at 2.0V, a device may use up to 500 mA of current from the power source. When D+ is held at 2.0V and D− is held at 2.8 V, a device may use up to 1 A of current from the charger. By detecting voltages on these lines, or data pins, case 930 can determine a maximum amount of current to draw from the power source. In some situations, the voltages or states of D+ and D− may be propagated through case 930 and/or duplicated at a connector to an attached electronic device. This enables the electronic device to detect what type of power source is being used even though the electronic device is not directly connected to the power source. Many other configurations and methods of detecting characteristics of or information about the power source are possible.

A power source may use D+ and D− to indicate capabilities of the power source, as described above, in a temporary or permanent manner. For example, the power source may indicate the capabilities, and/or other characteristics, of the power source by asserting predetermined voltages on the D+ and/or D− lines, as described above, throughout the entire period of time the power source is connected to a device. Alternately, the power source may assert these voltages on the D+ and D− lines for only a shortened period of time. In one example, the power source asserts the capability indicating voltages for a predetermined number of seconds when a device is initially connected and then reverts to using the D+ and/or the D− line for other purposes, such as transferring data.

A fourth method of determining a maximum current limit or other power capabilities of a power source is conducting of trial and error testing. A host device using power from a power source may iteratively draw increasing levels of power or current from the power source until there is an indication that the power source is reaching or has reached its maximum capabilities. In one case, the indication that the power source is nearing its maximum capability may be indicated by the power source having difficulty maintaining a supply voltage.

For example, if a power source is supplying power at 5V and is having difficulty meeting increasing current requirements, the supply voltage may begin dropping to 4.9V, 4.8V, or lower. By gradually increasing the current draw from the power source and detecting changes in the supply voltage, or some other characteristic of the supplied power, the host can the determine a maximum current draw for the power source.

In another configuration, a maximum capability of a power source may be indicated when the power source reaches a failsafe or circuit breaker mode. For example, some power sources are designed with protection capabilities that limit or discontinue output from the power source if a maximum power, voltage, or current draw is exceeded. A device using power from the source can experimentally determine this maximum power or current capability by gradually increasing current or power draw from the power source until a failsafe of circuit breaker limit of this type is reached and then set a maximum power or current draw value for the power source at an amount that is less than the identified failsafe or circuit breaker limit. In some situations, the power source may have to be reset, rebooted, or be otherwise reconfigured after it has reached a failsafe or circuit breaker limit.

Processor 921 may also configure or command current control module 929 to limit an amount of current that is delivered to each of several outputs of current control module 929. For example, in FIG. 9, current control module 929 has one output to battery charger 922 for charging battery 923 and one output which supplies power directly to an electronic device, such as electronic device 220. Case 930 may be configured to manage how power or current is distributed among one or more internal batteries and an electronic device attached to the case in a number of different ways, as will be described in detail below.

In one configuration, an electronic device connected to case 930 is permitted to consume as much of the available current from the power source as it can consume, up to a maximum current limit which has been determined by processor 921 and is being controlled by current control module 929. If the electronic device is consuming less current than the maximum current limit, processor 921 then commands current control module 929 to permit the balance of the available current (i.e., the current limit minus the current being used by the electronic device) to be sent to battery charger 922 for charging battery 923. In this way, the electronic device is permitted to use the maximum amount of current it can consume for charging its internal battery while using any remaining available current for charging battery 923 in case 930 and without exceeding the maximum current available from the source. In determining the balance of the available current, the current consumed by other components of case 930 may also be taken into account.

In the configuration described above, the current drawn from the power source is limited to the maximum value designated for that power source, but the current path from the power source to the electronic device is not limited to any specific amount below that maximum value. Presuming the current consumption of the electronic device does not exceed the maximum limit for the power source, the electronic device uses, in this configuration, essentially the same amount of current and charges at essentially the same rate as it would if it were connected directly to the power source. This allows the electronic device to be charged at the maximum rate which is safe for the power source while making use of any additional current which is not being used by the electronic device to charge battery 923.

In another configuration, the current supplied to the electronic device from a power source is limited by case 930 to a maximum value that is less than a maximum current that can be drawn from the power source. For example, a power source connected to case 930 may be specified for supplying 2 A of current. However, case 930 may limit the amount of current supplied to the electronic device to a lower value. This limitation may be imposed in order to reserve current for charging of battery 923, or for other reasons such as for thermal control. This type of control over current allocation allows case 930 to control the rate at which the electronic device is charged, while reserving a designated portion of the current to charging battery 923. In this way, battery 923 and a battery in the electronic device can be simultaneously charged in a controlled manner. Also, the rate of charge of each of these two batteries and/or the relative priority of their charging can be controlled by controlling how much current is allocated to each. While the current delivered to the electronic device is primarily described as current for charging the battery of the electronic device, it should be understood that current delivered to the electronic device may also be used to operate the electronic device depending on the state of the electronic device and the state of the battery of the electronic device.

In some situations, current control module 929 may not limit the current that flows from the power source directly to an electronic device attached to case 930, but may simply act as a current measuring device which provides an indication of how much current the electronic device is using. Similar to previous examples, this information may be used to determine how much additional current is available for and should be allocated to battery charger 922 for purposes of charging battery 923.

In some configurations, case 930 may have two or more power connectors for connecting to various types of power sources. In the example of two power connectors, one may be configured for connection to a low power source with limited power capability (i.e., a low power source) while the other may be configured for connection to a power source with increase power capabilities (i.e., a high power source). A single current control module, such as current control module 939 may be configured to operate with both power sources or separate current control modules may be associated with each of the two power inputs. The different power source connections may have different mechanical characteristics. In one example, the low power connector may be a mini USB connector, such as port 1705, while the high power connector may be a connector such as connector 105, as shown in FIG. 1. In some cases one of the connectors may comprise contact surfaces rather than a connector with an engagement mechanism. Contact surfaces often provide more conductor area for conducting larger amounts of power. In addition, contact surfaces may allow case 930 to be more easily be placed in electrical contact with a power source because the use of these types of electrical contacts will typically relax the alignment requirements for making a connection. In one example, the high power connector may be engaged by simply lowering case 930 into a docking device such as a docking station 505. In this example, the electrical connection may be maintained by the weight of case 930 and the associated electronic device.

While many of the functions of case 930 are described as being controlled by processor 921, it should be understood that a microprocessor is not required to perform the techniques described here. The techniques may also be performed by a logic state machine and/or electrical circuitry configured for these purposes.

In other configurations, case 930 may charge from a power source wirelessly. Wireless or inductive charging relies on an electromagnetic field to transfer power between a power source and case 930. The power source will typically have an induction coil to create an alternating electromagnetic field. Case 930 will also have an induction coil that, when placed closely enough the induction coil of the power source, captures power from the electromagnetic field and coverts it back into electrical current for case 930.

In FIG. 9, the determination regarding how the available current will be allocated among the electronic device and battery charger 922 (for charging battery 923) may be based on a variety of factors. These factors may include: the charge state of battery 923, the charge state of the battery of the electronic device, the capacity of battery 923, the capacity of the battery of the electronic device, charging rates of one or more of the batteries, ages of one or more of the batteries, numbers of charging cycles the batteries have endured, the temperature of one or more of the batteries, another factor indicating health or condition of one or more of the batteries, the quantity of current available from the power source, historical usage patterns of the electronic device, user preferences, user input, or combinations thereof. A charge state of a battery may include the current charge level as a percentage of the battery's full capacity and may also include other information indicative of the battery's health or capabilities. The allocation of the current may be changed when case 930 is connected to a new power source and/or to a power source of a different capacity. The various factors listed above may also be monitored on an ongoing or periodic basis during the charging and the allocation of current may be changed based on changing circumstances as indicated by changes in one or more of the factors listed above.

As illustrated in FIG. 9, case 930 may also include one or more data input device(s). These data input device(s) may include one or more of switches, a keypad, a mouse, a trackball, a pointing device, a bar code scanner, a credit card reader, a radio frequency identification (RFID) tag reader, a near field communication (NFC) device, and/or a data receiving device of another type. In addition, case 930 may include a data output device such as a printer, a radio frequency (RF) transmitter, and/or a memory card.

Power source 1010 may be a docking station that is capable of simultaneously charging a plurality of case 1030s. As with other power sources, the docking station may have a maximum current limit it is able to supply to docked case(s), collectively. In some configurations, the docking station may command the docked cases to consume no more than a specified amount of current. For example, if the docking station is capable of supplying up to 6 A of charging current and four cases are currently docked, the docking station may command each of the docked cases to consume no more than 1.5 A each. If one of the docked cases is then removed, the docking station may dynamically adjust the limit for each of the remaining 3 devices up to a maximum of 2 A of current each. In another example, one or more of the docked cases may be given a current limit that is higher than the other cases based on a charge state of one or more of its batteries.

Figure 10:
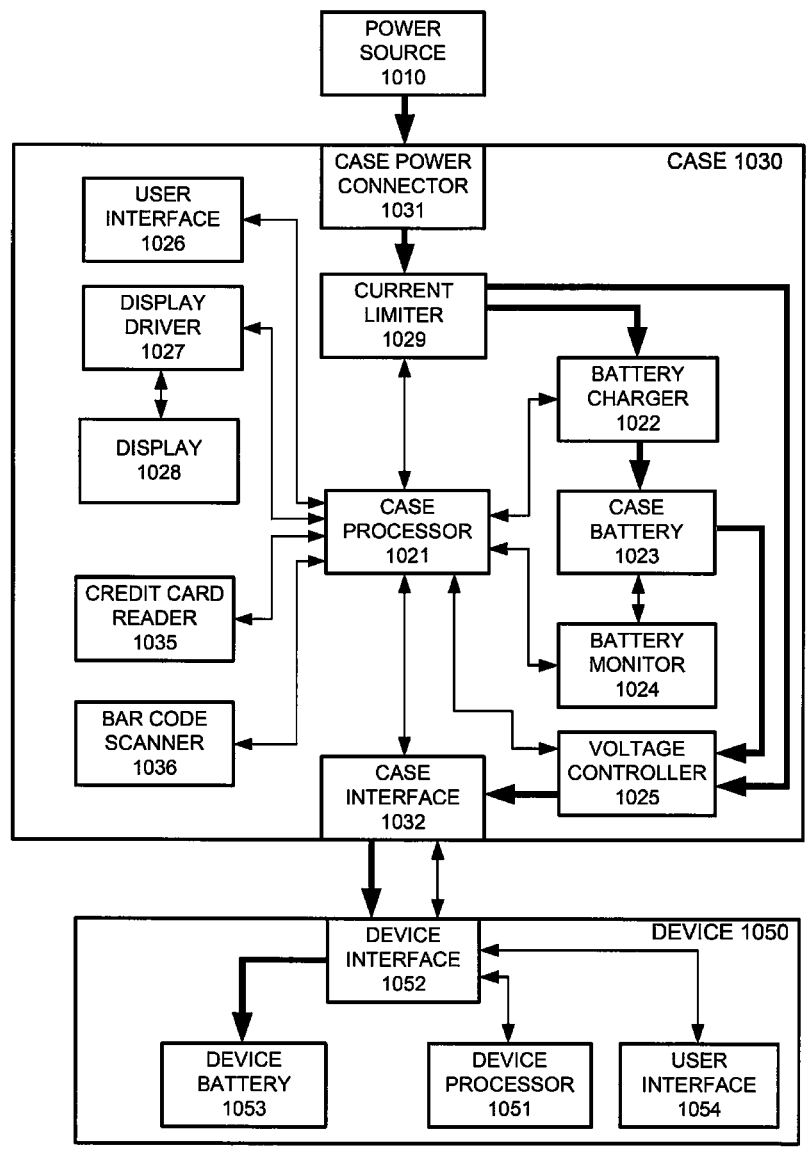
FIG. 10 illustrates a case interfaced to a power source and a device in one embodiment of the techniques disclosed herein.

FIG. 10 illustrates a case 1030 interfaced to power source 1010 and device 1050 in one embodiment of the techniques disclosed herein. Back shell 215 is an example of case 1030. Some or all of the electrical components of case 1030 may be included on one or more printed circuit boards.

Device 1050 may be a tablet, smartphone, mobile communication device, mobile computing device, portable computer, laptop, or computing device of another type. In one specific example, device 1050 is an APPLE IPAD used as a mobile point of sale device in a retail shopping environment in conjunction with case 1030. Device 1050 includes device interface 1052, device battery 1053, user interface 1054, and device processor 1051. Device processor 1051 may be any type of microcontroller, microprocessor, microcomputer, programmable logic device, reconfigurable circuit, or application specific circuit that is configured to operate device 1050 or a portion of device 1050. Device battery 1053 is a rechargeable battery that is integrated within or attached to device 1050. User interface 1054 may include a touchscreen, a button, a switch, a keyboard, a pointing device, or a combination thereof, enabling a user to interact with device 1050.

Device interface 1052 provides an electrical interface between device 1050 and a cable or device. Device interface 1052 includes electrical conductors for providing power to charge device battery 1053 as well as providing control and data lines for communicating with device processor 1051 or other components of device 1050. In one example, device interface 1052 may comprise an APPLE 30 pin connector. In another case, device interface 1052 may comprise an APPLE LIGHTNING connector. In yet another example, device interface 1052 may be an industry standardized connector or a proprietary connector or interface associated with another device manufacturer.

Case interface 1032 comprises an electrical and mechanical interface that is compatible with and mates with device interface 1052. Case interface 1032 enables power and communications to be exchanged between case 1030 and device 1050.

In some situations, case interface 1032 may have to meet certain requirements to be compatible with device 1050. For example, if device 1050 is an APPLE IPAD, case interface 1052 may have to meet the requirements of the APPLE Made for IPHONE/IPAD/IPOD (MFI) program. In addition, case interface 1032, or some other element of case 1030, may include an authentication chip or other type of electronic authentication device that may be necessary to establish communications between case 1030 and device 1050.

Case 1030 may be designed and manufactured in variations each having a case interface 1032 that is configured to interface with different electronic devices or families of electronic devices. Each variation of case 1030 may include a different mechanical, electrical, and/or protocol interface for interacting with the one or a family of electronic devices that are compatible with that particular interface. For example, one implementation of case 1030 may have an interface and protocol capable of interfacing with a particular generation of IPAD, while another implementation of case 1030 may have an interface capable of interfacing with a tablet made by another manufacturer. In some situations, case processor 1021 may execute software which is customized for a particular electronic device or use parameters that are customized for a particular electronic device. If case 1030 is interfaced to an ANDROID-based computing device, case interface 1032 may have to be compliant with ANDROID Open Accessory protocol, or a similar protocol, for detecting and setting up communication between case 1030 and the computing device.

Device 1050 will typically have many components in addition to those that are illustrated in FIG. 10, such as a display and/or communication components. For purposes of clarity, only those components of device 1050 that are most pertinent to the techniques and apparatuses described herein are illustrated in device 1050. However, it should be understood that the techniques and apparatuses described herein are not to be limited to any particular type or configuration of electronic device.

Power source 1010 comprises any source of power for charging case 1030 and/or device 1050. Power source 1010 could be a charger compatible device 1050 that is plugged into a wall outlet, an automobile charger for device 1050, a custom charging stand, a USB port, or any other type of electrical device that provides current at a designated voltage or in a designated voltage range. In some situations, power source 1010 may be integrated into another device, such as a USB port in a computer. Power source 1010 may be connected to case 1030 using a cable such as cable 230.

Case 1030 includes case processor 1021, battery charger 1022, case battery 1023, battery monitor 1024, voltage controller 1025, user interface 1026, display driver 1027, display 1028, credit card reader 1035, bar code scanner 1036, current limiter 1029, case power connector 1031, and case interface 1032. Case processor 1021 is an example of processor 921. Battery charger 1022 is an example of battery charger 922. Battery 220 is an example of case battery 1023. Battery monitor 1024 is an example of battery monitor 924. Current limiter 1029 is an example of current control module 929. Credit card reader 1035 and bar code scanner 1036 are examples of data input device(s) 933. In addition to the functions described below, case 1030 also provides physical protection to device 1050. Physical protection may include protection from the effects of impact, shock, scratching, puncture, liquids, dust, sunlight, or other forces which could potentially damage or affect the operation of device 1050. In some configurations, case battery 1023 may be external to case 1030 and case 1030 may include one or more interfaces or slots capable of providing an interconnection to one or more external batteries similar to case battery 1023.

Case power connector 1031 is any type of electromechanical connector that allows power source 1010 to be electrically interconnected to case 1030. Case power connector 1031 may comprise a USB connector, a mini USB connector, a micro USB connector, a cylindrical connector, or a connector of another type, including combinations thereof. Case power connector 1031 may also include conductors for communication and/or transfer of data enabling power source 1010, or another device, to communicate with case processor 1021. Port 1705 is an example of case power connector 1031.

In some situations, case power connector 1031 may support other functions when not connected to a power source. For example, case power connector 1031 may also be configured to support communication between device 1050 and an input device or peripheral such as: an external keyboard, a mouse, a display, a GPS device, a mobile phone, a smartphone, a computing device, or a combination thereof. In some cases, in addition supporting the communication between one or more of these input or peripheral devices and device 1050, case 1030 may also supply power to one or more of these devices through case power connector 1031. As described above with respect to FIG. 9, case 1030 may also have multiple power connectors in different mechanical and/or electrical configurations. In some configurations, the multiple power connectors may be configured for different current levels.

Display 1028 comprises any device for visually conveying information to a user of case 1030 and/or device 1050. Display 1028 may include one or more of: a light emitting diode (LED), an organic light emitting diode (OLED), a liquid crystal display (LCD), electronic paper, electrophoretic ink, another type of device for visually conveying information to a user, or combination thereof.

Display 1028 may be used to convey to a user information about case 1030 and/or device 1050 including: a state or mode of case 1030, a state or mode of device 1050, a charge level of case battery 1023, a charge level of device battery 1053, and/or a combined charge level of case battery 1023 and device battery 1053. Display driver 1027 is a device for controlling, operating, driving, and/or managing the one or more elements which make up display 1028. User interface 1026 is any type of device for receiving an input or a selection from a user of case 1030. User interface 1026 may include a switch, a button, a group of switches or buttons, a touchscreen, a proximity sensor, a keyboard, a keypad, a mouse, a trackball, a touchpad, a joystick, or a combination thereof. Buttons are examples of user interface 1026. In some configurations, user interface 1026 may be an interface to an external user interface device that is not contained within or part of case 1030.

User interface 1026 may also be used for purposes other than activating display 1029. In one example, a user may hold down a switch associated with user interface 1026 for a predetermined number of seconds in order to reset case processor 1021 and/or other components of case 1030. In another example, one or more switches that make up user interface 1026 may be pressed in a predetermined pattern or sequence to change an operating mode of case processor 1021 and/or case 1030. Inputs to user interface 1026 may also be used to provide inputs to and/or change an operating mode of device 1050. Display 1028 may also be used to display information relating to the input of data through user interface 1026. For example, if user interface 1026 includes one or more switches which are used to select from among various settings or menu choices, LEDs which make up display 1028 may be used to indicate a menu item, a selection of a setting, and/or a current state of a menu item or setting.

Many other types of input devices and display devices are known in the art and may be used to implement user interface 1026 and/or display 1028. The apparatuses, solutions, and techniques disclosed herein are not to be limited to any specific type of user input device, user interface, display device, method of receiving input from a user, or method of displaying information to a user.

Credit card reader 1035 is any device for reading a credit card, debit card, pre-paid card, gift card, or other type of payment device. Credit card reader 1035 may read a magnetic strip of a payment device and/or may read payment device information through RF communication with the payment device.

Bar code scanner 1036 is any device for reading product identifying data, such as a Universal Product Code (UPC), from an object. Bar code scanner 1036 may include a laser that is swept across a bar code or may read information from a product using electronic or RF communication, as is done when reading and RFID tag that is on or within a product.

Voltage controller 1025 is a device for adjusting the voltage of power output by case battery 1023 to device 1052. In one example, case battery 1023 and device battery 1053 are both 3.7 volt (3.7V) batteries. In this example, case 1030 is designed to receive power at 5 volts (5V) because some common interfaces (i.e., USB) are specified to provide power at 5V. Consequently, device 1050 may also be configured to receive power at 5V with that voltage being internally stepped down in device 1050 (not shown) before it is applied to device battery 1053. When charging case battery 1023, battery charger 1022, or another voltage regulation or adjustment device, steps down the 5V received from power source 1010 to an appropriate voltage for charging case battery 1023. Even though, in this example, case battery 1023 and device battery 1053 are both 3.7V batteries, current provided from case battery 1023 to device battery 1053 must be stepped up to 5V by voltage controller 1025 because 5V is expected at device interface 1052 and device 1050 has been otherwise designed to use current supplied at 5V to charge device battery 1053. Many other combinations of voltages are possible.

In addition to adjusting the voltage output from case 1030 to device 1050, voltage controller 1025 may also perform a switching function for the power delivered from case battery 1023 to device 1050. For example, depending on a selected charge profile and the states of case battery 1023 and device battery 1053, it may be desirable to prohibit current flow from case battery 1023 to device 1050 in some circumstances. For example, even though device battery 1053 is not at 100% charge and case 1030 is not connected to power source 1010, case 1030 may not deliver power from case battery 1023 to device 1050 until the charge level of device battery 1053 drops below a specified level (i.e., device battery 1053 drops below 60% charge).

In addition to stepping voltage up and/or down, voltage controller 1025 may also perform this switching function under the control of case processor 1021. Alternately, the switching function may be performed by a component of case 1030 separate from voltage controller 1025.

In addition to supplying power to device 1050, case 1030 communicates with device 1050 using case interface 1032 and device interface 1052. This communication may be used to manage and/or control various power and battery charging related functions and/or exchange data for other purposes. While the communication between case 1030 and device interface 1052 is illustrated as being conducted using the same interface and/or connector that is used to supply power to device 1050, it should be understood that this communication may also occur using a different interface and/or connector than is used to supply power from case 1030 to device 1050. Communication between case 1030 and device 1050 may occur through one or more different communication methods and/or protocols. For example, communication between case 1030 and device 1050 may occur using a wired connection, a wireless link, near field communication, magnetic communication, inductive communication, light wave communication, infrared communication, audio frequency communication, or a combination thereof.

Communication between case 1030 and device 1050 may be automatically established when they are connected or may be established only when communication between case 1030 and device 1050 is necessary. As used herein, the term 'communication' is intended to mean communicating data or information. 'Communication' is not intended to include the supplying of power from one device to another. In some situations, case 1030 may interface to case 1050 in multiple ways. For example, case 1030 may transfer power to and communicate with an IPAD using an APPLE 30 pin or LIGHTNING connector. In other situations, one connector may be used to transfer power from case 1030 to device 1050 while data communications between them occur through another connector (for example, through a headphone or microphone port) on device 1050.

In addition to the methods discussed above for controlling how much current an electronic device is permitted to consume, case 1030 may also command or direct device 1050 to use no more than a specified amount of current by sending a command or instruction using one or more of the communication methods described above. In some situations, case 1030 may send a command to device 1050, or another similar device such as electronic device 205, directing the device to consume a specified amount, or no more than a specified amount, of current. This command may be issued in the form of a specific current limit (i.e., 350 mA) or may be a selection of one of a small number of pre-defined charging levels (i.e., charging level 2 of 4).

In one example, even though device 1050 may be capable of consuming up to 750 mA of current, case 1030 may send a command, or other type of communication, to device 1050 instructing it to limit consumption to a lesser amount, 400 mA for example. This type of command may be used to limit the current consumed by device 1050 rather than by limiting it using current limiter 1029 or current control module 929 as described in previous examples. Existing electronic device case solutions do not provide a means of performing these types of communications between a case and the associated electronic device. Therefore, existing solutions do not provide these types of intelligent charging and power management features between a case and the associated electronic device.

Case 1030 may issue a command or use other communication with device 1050 to limit current to device 1050 for a number of reasons. In one example, case 1030 may limit the current to device 1050 in order to preserve some current for charging case battery 1023. In another example, case 1030 may limit current to device 1050 in order to protect power source 1010 from being overburdened. In another example, case 1030 may limit current to device 1050 in order to synchronize the charging of device battery 1053 and case battery 1023 such that they will both be finished charging at approximately the same time. This may include ongoing monitoring of the state of the two batteries and periodic adjustment of how current is allocated between the two in order to dynamically compensate for their changing states and/or charging rates. In another example, case 1030 may limit current to device 1050 for thermal management purposes. Case 1030 may limit the current in order to manage a temperature of device 1050, a temperature of a component of device 1050, a temperature of case 1030, a temperature of a component of case 1030, a temperature of power source 1010, or a combination thereof.

Case 1030 may also allocate current between itself and device 1050 based on how much current device 1050 is currently consuming. If device 1050 is currently in an active operational mode and consuming a relatively large amount of current, case 1030 may allocate a larger portion of the current available from power source 1010 to counterbalance the effects of device battery 1053 being depleted at a relatively high rate due to the operation of device 1050. The allocation may be dynamically adjusted based on how the electronic device is being used.

In some situations, case 1030 may control the allocation of current between case 1030 and device 1050 in accordance with a usage profile. A usage profile may be a default profile programmed into case 1030 or may be a set of user-defined or user-modified parameters. For example, a usage profile may indicate that a user always wishes for device battery 1053 to be fully charged before the charging of case battery 1023 begins. This configuration is convenient for a use model in which device 1050 is sometimes used without case 1030 because device battery 1053 will always have the maximum possible charge, relative to case battery 1023. If device 1050 is disconnected from case 1030 and used independent of case 1030 for a period of time, it may potentially be used for a longer period of time in this mode because the charging of device battery 1053 has been prioritized.

Because batteries may charge more efficiently or effectively when charged more slowly, case 1030 may also limit the amount of current allocated to case battery 1023 and/or device 1050 in order to accomplish a slower or more gradual charge cycle for one or more of the batteries, rather than using a larger amount of the available current to charge the batteries serially in time (i.e., direct all or most the available current to charge one of the batteries first and then divert the current to the second battery when the first is fully or nearly fully charged). When charged in this manner, case 1030 may be supplying less current to device 1050 than device 1050 would consume if connected directly to a power source.

In some situations, the slow charging approach described above may also involve communication between case 1030 and device 1050 regarding what type of charge cycle or charge mode is being used or is planned to be used. In one example, case 1030 may communicate with device 1050 to obtain information about device battery 1053 or preferred charging characteristics for device battery 1053. The selection of a charging mode may also be based on a usage profile, a user profile, a type of power source 1010, a capacity of power source, 1010, or a combination thereof.

Case 1030 may also adjust the allocation of current to device 1050 based on the operational mode of device 1050. If device 1050 is operational and consuming current, case 1030 may allocate more current to device 1050 in order to provide current for device 1050 to operate as well as to charge device battery 1053. For example, it may be desirable to charge device battery 1053 using 500 mA of current. Case 1030 may provide 500 mA of current for this purpose, or may command device 1050 to only draw 500 mA, when device 1050 is in a standby, low power, or hibernate mode. However, if device 1050 is active and is consuming more power, case 1030 may change the allocation of current to device 1050 in order to accommodate the power usage of device 1050 while maintaining the charging of device battery 1053 at approximately the same rate as it had been charging when device 1050 was in standby, low power, or hibernate mode. In other words, case 1030 may adjust the amount of current supplied to device 1050 in order to keep the amount of current available for charging of device battery 1053 roughly constant while the operational mode of device 1050 is changing. Case 1030 may receive information about the operating mode of device 1050 through communication with device 1050 using one of the methods described above, by monitoring current consumption of device 1050, or by other means. In some configurations, rather measuring the current consumed by device 1050, device 1050 may measure its own power consumption and provide this information to case 1030.

Case 1030 may also provide improved power management functions when attached to device 1050 with respect to the use or discharge of case battery 1023 and/or device battery 1053. Existing solutions may fully, or nearly fully, discharge one battery before use of the other begins. However, some types of batteries operate more efficiently (i.e., can provide more total power over time) when discharged more slowly. Consequently, using case battery 1023 and device battery 1053 to jointly, simultaneously satisfy the current needs of device 1050 may effectively increase the amount of power available from the two batteries thereby increasing the time that device 1050 can be used before recharging is necessary. In order to properly manage simultaneous battery use or discharge, case 1030 may communicate with device 1050 using one of the previously described methods to obtain information regarding one or more of the following: the current charge state of device battery 1053, a rate of current usage from device battery 1053 by device 1050, a total rate of current usage by device 1050, an operational mode of device 1050, or a combination thereof.

In some situations, case 1030 may toggle between the various charging and discharging operations modes described above based on a time of day and/or a day of week. For example, device 1050 may be used more heavily during daytime and evening hours and more infrequently during night hours. Therefore, case 1030 may allocate available current from power source 1010 to case battery 1023 and device 1050 differently during these various periods. During nighttime hours, it may be more likely that power source 1010 will remain connected for a longer period of time. Therefore, during these periods it may be more efficient to simultaneously charge both batteries and/or charge one or more of the batteries using a lower charging current (i.e., a slower charge rate). This may result in a more complete charge while having little effect on flexibility because it is more likely case 1030 will remain connected to power source 1010 for a long enough time period to fully charge both batteries. Case 1030 may access a clock, calendar, or other schedule information on device 1050 to make charging profile determinations.

In some situations, it may be beneficial to charge device battery 1053 at a lower charging rate when it is near, or as it nears, full capacity. Consequently, case 1030 may determine a charging rate or charging current level such that it has an inverse relationship to the charge state, or percentage of full capacity, of the device battery 1053. The charging rate may be periodically adjusted as device battery 1053 and/or case battery 1023 are charged.

Case 1030 may also include capabilities to monitor its own power level and perform mode changes accordingly. In one example, case 1030 is connected to device 1050 but is not connected to power source 1010. Case 1030 monitors the level of case battery 1023 and deactivates or shuts down case 1030 when the level of case battery 1023 drops below a predetermined level. Case 1030 may be put into a sleep or hibernate mode or may be shut down entirely. In this way, device 1050 will no longer attempt to draw current from or communicate with case 1030 and device 1050 may operate, at least temporarily, as if it is not attached to case 1030 even though it may remain physically attached to case 1030.

A software application may be run on device processor 1051 of device 1050 to monitor, configure, or view data associated with the various charging and power management features described herein. The software application may reside on case 1030 and be loaded from case 1030 to device 1050 when device 1050 is attached to case 1030. Alternately, case 1030 may provide instructions to device 1050 directing device 1050 to obtain the software application from another location. For example, when connected to device 1050, case 1030 may provide a universal resource locator (URL) to device 1050 that device 1050 can use to download to the application from a website or a server associated with the URL. The URL may also be associated with a manufacturer or supplier of device 1050, a manufacturer or supplier of case 1030, or an application store or download site from which the software application may be downloaded.

In addition to the types of information described above, case 1030 may also provide other types of information to device 1050 or to a software application running on device 1050. For example, case 1030 may transmit one or more messages to device 1050 that include information such as: an indication that the supply of power from case 1030 to device 1050 is about to be cut, an indication that the level of current from case 1030 to device 1050 is about to be changed, information about power source 1010, and/or a status of case 1030.

Case 1030 may also communicate with other devices or systems using the communication capabilities of device 1050. For example, case 1030 may transmit a request to device 1050, or a software application running on device 1050. Then, the request is transmitted to a recipient by device 1050, such as to a server over a wireless communication network. Device 1050 may receive a response to the request and transmit that response to case 1030. In one example, the request may be for a firmware update for case 1030 and the response may include the firmware update.

In another example, historical charging and device usage information may be collected by case 1030 and/or device 1050 and transmitted to a recipient for analysis. Based on the historical information, the recipient may provide a new recommended charging profile, pattern, or algorithm that better suits that user's behaviors and usage patterns. Case 1030 receives, via device 1050, the new recommended charging profile, pattern, or algorithm and substitutes it for the previous one. In this way, case 1030 can optimize the charging algorithm for each user based on their actual usage patterns.

The software application may communicate with case 1030 in a variety of ways. In one example, the software application, running on device processor 1051, may communicate with case 1030 using device interface 1052. In another example, the software application may communicate directly only with device 1050 and rely on software or firmware contained in device 1050 to relay messages to or perform communications with case 1030.

In the situation where device 150 is a device designed or manufactured by APPLE, a software application running on device 1050 may communicate with case 1030 using the APPLE external accessory framework. The external accessory framework provides a conduit for communicating between APPLE devices and attached accessories. This conduit may be used to integrate accessory level features into software applications. Features or functions of case 1030 can be integrated into a software application, if any, running on case 1030 using this framework.

Communicating with an external accessory typically requires working closely with the accessory manufacturer to understand the services provided by that accessory. Manufacturers must build explicit support into their accessory hardware for communicating with iOS. As part of this support, an accessory must support at least one command protocol, which is a custom scheme for sending data back and forth between the accessory and an attached application.

In one example, the software application may be configured to display one or more of many different types of information for each battery including: battery type, battery capacity, current battery charge level, battery age, battery health, and number of charge/discharge cycles. In addition, the software application may also determine a power remaining metric, based on the charge remaining in each of the batteries, and display an estimated amount of operation time remaining for device 1050 based on the power remaining metric. The time remaining may be expressed as a percentage (i.e., 30% remaining) or as an amount of time (i.e., 2 hours and 45 minutes). The estimated amount of time remaining may be based on tracking how much power has been used over a recent period of time, a current operating mode of device 1050, other battery life prediction methods, battery health, or a combination thereof. The time remaining may be expressed as a combined figure which takes both batteries into account but also conveys how much of that total is provided by each of two or more batteries.

Transaction processing software may also be executed on device 1050 by device processor 1051 to perform various POS-related functions. For example, the transaction software may communicate with case processor 1021 to receive information about the various products scanned by bar code scanner 1036. The software may also perform various functions such as generating a total purchase price for the scanned products, computing sales tax, and/or communicating the payment information to a payment processing system. User inputs for navigating the transaction software may be received at user interface 1054 of device 1050 and/or user interface 1026 of case 1030. In one example, the menus of the transaction software may be navigated through one or more switches on the bottom of case 1030 as illustrated in FIG. 3. A user may use these switches to navigate the menus of the transaction software using a single hand. In one variation, rather than switches, case 1030 may include a touch pressure sensitive mouse pad or other pointing device on the bottom of case 1030 that the user operates using one or more fingers of the hand holding case 1030.

Using credit card reader 1035 and bar code scanner 1036, device 1050 may be used as a mobile point of sale terminal in a retail or other business environment. Device 1050, in conjunction with case 1030, can be carried around a store for scanning various products of interest. When all of the products of interest have been selected and scanned, payment information may be obtained using credit card reader 1035. One or more software applications running on device processor 1051 may be used to facilitate the transaction processes described above. In addition to using device 1050 and case 1030 as a POS terminal, the combined device may also be used for other mobile information processing purposes such as conducting inventory, filling orders in a warehouse, gathering field data, or taking orders at a restaurant.

Case 1030 may also include a solar cell or other alternate type of power source. A solar cell can be used to supplement the power needed to operate device 1050 and charge one or more of the batteries when case 1030 is exposed to light of a sufficient intensity to generate current from the solar cell. Case processor 1021, in conjunction with current limiter 1029, may be configured to allocate current from the solar cell among case 1030 and device 1050. When power source 1010 is connected to case 1030, case 1030 may perform these processes with respect to the combined current available from power source 1010 and the solar cell.

In another variation of the apparatuses and techniques described herein, bar code scanner 1036 may be a wand, pen, or other handheld scanner (not shown) that docks in case 1030 and can be removed by the user to scan products. This allows a user to hold or carry case 1030 in one hand and scan products using the wand held in the other hand. This minimizes the amount of movement the user must perform with case 1030 itself. The wand may communicate, including wirelessly, with case 1030 and/or device 1050. When docked in case 1030, circuitry associated with a rechargeable battery of the wand may be electrically interconnected to the battery charging circuitry of case 1030. The current limiting and allocation processes described herein with respect to case battery 1023 and device battery 1053 may also accommodate the battery of the wand in similar manners.

In addition to using WiFi and Bluetooth for communications, some computing devices also use near field communication (NFC). NFC is defined by a set of standards for radio frequency (RF) communication between two devices. NFC is related to radio-frequency identification (RFID) standards. Typically NFC enabled devices are able to communicate with each other after bringing them in close proximity (i.e., a few centimeters) of each other. In some situations, NFC communications may be used to set up or bootstrap a faster and/or more complex communication channel.

Case 1030 may also include one or more sensors for detecting environmental or handling conditions associated with case 1030. For example, case 1030 may include an accelerometer or temperature sensor to track whether case 1030 has been dropped, subject to impact, or exposed to an area that was either too hot or too cold. This information may be used for determining a warranty status of case 1030 and/or device 1050.

Figure 11:
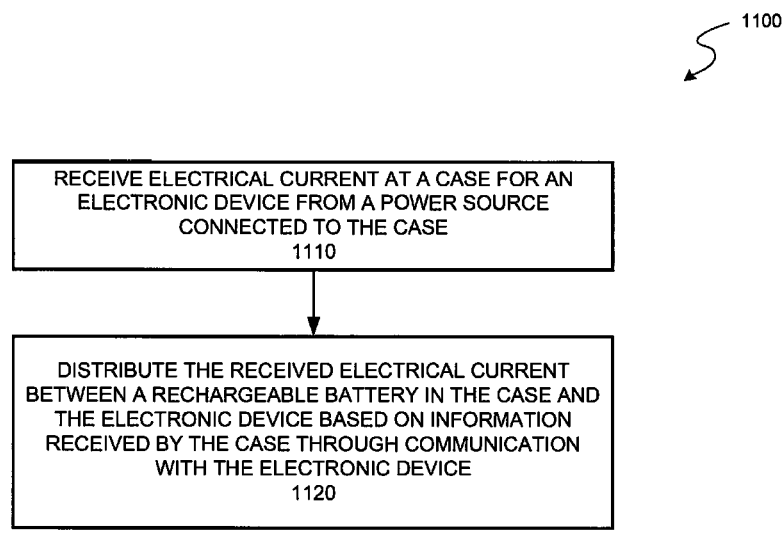
FIG. 11 illustrates a method of distributing current between a case and an electronic device in one embodiment of the techniques disclosed herein.

FIG. 11 illustrates a method of operating a case for an electronic device in one embodiment of the techniques disclosed herein. In step 1110 of FIG. 11, an electrical current is received at a case for an electronic device from a power source connected to the case. In step 1120, the received electrical current is distributed between a rechargeable battery in the case and the electronic device based on information received by the case through communication with the electronic device. The communication may involve transmitting information or data to the electronic device and/or receiving information or data from the electronic device.

Figure 12:
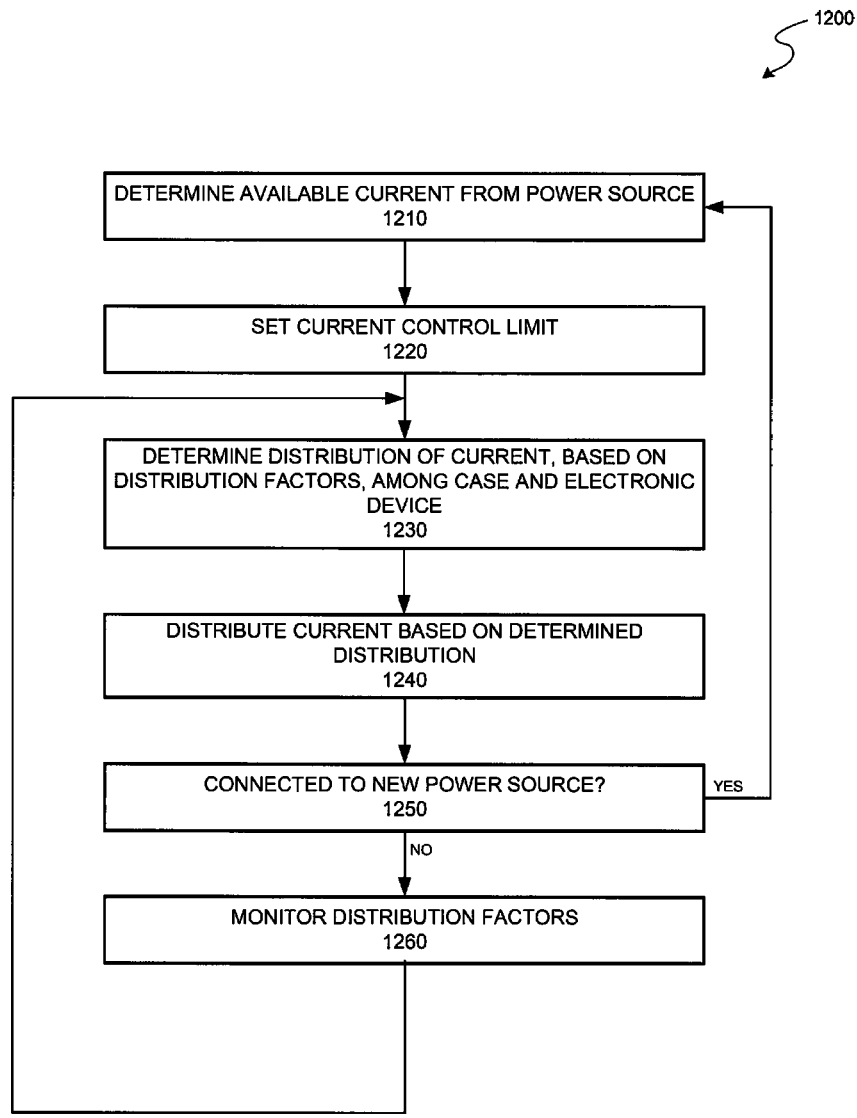
FIG. 12 illustrates an alternate method of distributing current between a case and an electronic device in another embodiment of the techniques disclosed herein.

FIG. 12 illustrates a method 1200 of operating a case for an electronic device in one embodiment of the techniques disclosed herein. In step 1210, an amount of current available from a power source is determined. In step 1220, a current control limit is set. In some situations, the current control limit is set based on the determined available current. At step 1230, a distribution of the current is determined among an electronic device and the case for the electronic device based on distribution factors. These distribution factors may include: a charge state of a battery in the case, a charge state of a battery in the electronic device, a capacity of one or both batteries, a charge rate of one or both batteries, an age of one or both batteries, numbers of charging cycles the batteries have endured, a temperature of one or both batteries, another factor indicating health or condition of one or both batteries, the quantity of current available from the power source, historical usage patterns of the electronic device, user preferences, user input, or combinations thereof.

In step 1240 of the method of FIG. 12, the current is distributed based on the determined distribution. In some situations, after current has been allocated or distributed to the electronic device, all of the remaining available current from the power source is distributed to the case and/or the case battery. In other situations, the total current consumed from the power source by the case, the electronic device, and any batteries being charged is less than the available current from the power source.

In step 1250 of the method of FIG. 12, a determination is made as to whether the case has been connected to a new power source. If it is connect to a new power source, the method returns to step 1210 and a determination is made regarding how much current is available from the new power source. If the case has not been connected to a new power source, the distribution factors continue to be monitored at step 1260. The distribution of current between the case and the electronic device may be dynamically adjusted as conditions change.

When a case is configured to charge a case battery and provide power to the electronic device simultaneously, a profile may indicate that both the case battery and a battery of the electronic device are to be charged simultaneously with a preference that they are charged at rates such that they reach full charge at approximately the same time. At the start of charging, the electronic device battery may be 5% full and the case battery 30% full. At the start of charging, based on the distribution factors, 75% of the available charging current may be allocated to charging the electronic device battery while the remaining 25% is allocated to charging the case battery. However, after time, the electronic device battery may be at 90% charge while the case battery has only reached 75%. In this situation, the allocation may be dynamically adjusted to divert more of the available current to the case battery.

Figure 13:
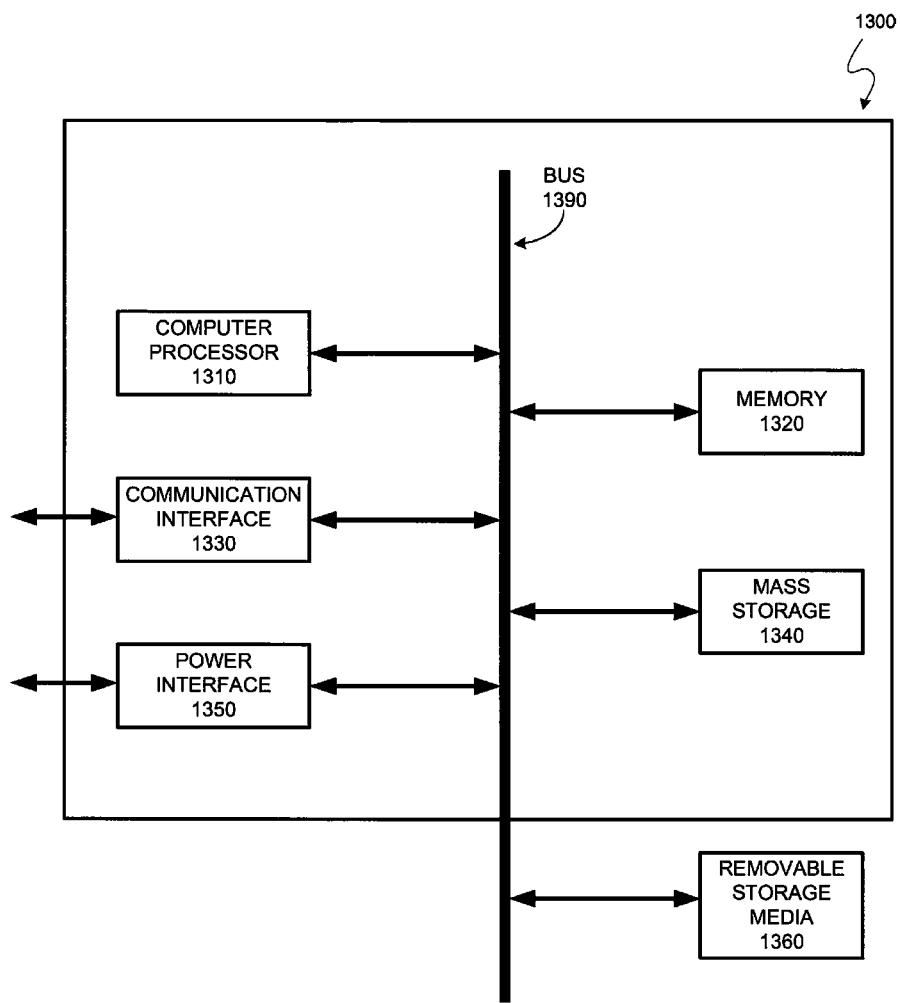
FIG. 13 illustrates a computer system for performing the techniques disclosed herein.

FIG. 13 illustrates computer system 1300 with which some embodiments of the techniques disclosed herein may be utilized. Some or all of the steps and operations associated with the techniques introduced here may be performed by hardware components or may be embodied in machine-executable instructions that cause a general purpose or special purpose computer processor programmed with the instructions to perform the steps. Alternatively, the steps may be performed by a combination of hardware, software, and/or firmware. According to the example of FIG. 13, computer system 1300 includes a bus 1390, at least one computer processor 1310, at least one communication interface 1330, at least one memory 1320, at least one mass storage 1340, and at least one power interface 1350. A removable storage media 1360 also interface to bus 1390 of computer system 1300.

Computer processor 1310 can be any known computer processor, central processing unit, microprocessor, microcontroller, programmable logic array, or programmable logic device. Computer processor 1310 may also interface to a coprocessor.

Communication interface 1330 can be any type of interface for communicating with another device or a network. Communication interface 1330 may be configured for communicating using a wired connection, a wireless connection, audio signals, light waves, infrared, or a combination thereof. Communication interface 1330 may be configured for communicating with or over a network such a Local Area Network (LAN), Wide Area Network (WAN), or any network to which computer system 1300 connects. Communication interface 1330 may also be configured to communicate with an electronic device such as a cellular phone, a smartphone, a tablet, a laptop computer, a server, or a digital audio device. The various functions of communication interface 1330 may be distributed across multiple communication interfaces. In one example, communication interface 1330 is a USB interface.

Memory 1320 can include random access memory (RAM), or any other type of dynamic data storage device commonly known in the art. Memory 1320 may also include one or more static storage devices such as read only memory (ROM), programmable read only memory (PROM), flash memory, magnetic memory, erasable programmable read only memory (EPROM), and/or electrically erasable programmable read only memory (EEPROM) for storing static data such as firmware or machine-executable instructions for computer processor 1310 or for another computer processor. In some configurations, memory 1320 may be contained within computer processor 1320 or within another device of computer system 1300.

Mass storage 1340 can include one or more persistent mass data storage devices or modules that may be used to store data, information, and/or instructions. Mass storage 1340 may include a hard drive, a tape drive, an optical drive, flash memory, a micro electromechanical storage device, or a combination thereof.

Power interface 1350 can be any type of interface for receiving and/or transmitting electrical power. The functions of power interface 1350 may be spread across multiple power interfaces. The functions of power interface 1350 may also be combined into a single connector and/or interface with communication interface 1330. For example, the functions of communication interface 1330 and power interface 1350 may both be implemented in the form of one or more USB interfaces.

Removable storage media 1360 can be any kind of external data storage device including a hard drive, a memory card, a subscriber identity module (SIM) card, flash memory, an optical drive, a tape drive, a micro electromechanical storage device, or a combination thereof.

Bus 1390 communicatively couples the elements of computer system 1300, as well as removable storage media 1360.

Bus 1390 may conform to an industry standard bus architecture and protocol or may use a proprietary architecture and/or protocol.

In one example, an electronic device case for a mobile point of sale can include a front shell attachable to a back shell, a flexible insert disposed between the front shell and the back shell and configured to at least partially surround an electronic device when installed in the case, a payment device reader attached to the case and configured to be electrically connected to the electronic device, a product information input device attached to the case and configured to be electrically connected to the electronic device, and a battery configured to be electrically connected to the electronic device.

In one example, the case can include a rotatable mount attached to an outer surface of the case, and a hand strap attached to the rotatable mount. The rotatable mount can include a first mount portion and a second mount portion, wherein the second mount portion is rotatably captured between the first mount portion and an outer surface of the back shell, and wherein the second mount portion can rotate with respect to the first mount portion and the back shell. The second mount portion can include a first opening and a second opening, and the hand strap can extend between the first opening and the second opening to form a hand slot configured to receive a user's hand, and the hand strap can be attached to the second mount at the first opening and at the second opening.

In one example, the first mount portion can include an external ring gear having at least one tooth, the external ring gear extending at least partially around an outer cylindrical surface of the first mount portion. The second mount portion can include an internal ring gear having at least one tooth, the internal ring gear extending at least partially around an inner cylindrical surface of a thru hole in the second mount portion, where the thru hole in the second mount portion is configured to receive the first mount portion when the first and second mount portions are assembled to the back shell. A radial clearance distance can exist between the external ring gear and the internal ring gear to allow the second mount portion to rotate freely with respect to the first mount portion when the first and second mount portions are assembled to the back shell. The radial clearance distance between the external ring gear of the first mount portion and the internal ring gear of the second mount portion can be about 0.010-0.050 inches. The second mount portion can include a first upright portion and a second upright portion, and deflection of the first upright portion and the second upright portion toward each other can cause the internal ring gear of the second mount portion to engage the external ring gear of the first mount portion. Applying a clockwise rotational force to the second mount portion while the internal ring gear of the second mount portion is engaged with the external ring gear of the first mount portion can allow for installation of the first and second mount portions to the back shell, and applying a counter-clockwise rotational force to the second mount portion while the internal ring gear of the second mount portion is engaged with the external ring gear of the first mount portion can allow for removal of the first and second mount portions from the back shell. Alternately, these rotational directions can be reversed.

In one example, the electronic device case can include an arcuate trigger on an outer surface of the back shell, where depressing the arcuate trigger is configured to actuate at least one button mounted within the case. The at least one button can be configured to activate a product information input device, where the product information input device is a bar code reader. The at least one button can be configured to activate the payment device reader, and the payment device reader can be a magnetic card reader. The electronic device case can include a trigger member having a base portion, a plurality of fingers, and an arcuate portion, where the base portion can be attached to an inner surface of the back shell, the fingers can extend from the base portion to the arcuate portion of the trigger member, the arcuate portion of the trigger member can be located proximate an inner surface of the arcuate trigger, and depressing the arcuate trigger can cause the arcuate portion to deflect relative to the base portion and actuate the at least one button. Depressing a first portion of the trigger member can actuate a first button, and depressing a second portion of the trigger member can actuate a second button. The first button can be configured to scroll through a menu displayed on a screen of the electronic device, and where the second button can be configured to select an option from the menu.

In one example, the electronic device case can include a shoulder strap having a first end and a second end, where the first end is attachable to a first attachment point on a first side surface of the case, where the second end is attachable to a second attachment point on a second side surface of the case, and where the case can swivel with respect to the first and second ends of the shoulder strap when the first and second ends of the shoulder strap are attached to the first and second attachment points, respectively.

In one example, the electronic device case can include a flexible membrane covering a display opening in the front shell of the case, where the flexible membrane allows for operability of a touch screen of the electronic device. The flexible membrane can have a thickness ranging from about 0.004 to 0.020 inches.

In one example, the electronic device case can include an air channel formed in the flexible insert, where the air channel extends from an outer surface of the electronic device to an opening in an outer surface of the case, and where the air channel allows for convective dissipation of heat from the electronic device through the opening in the outer surface of the case. The electronic device case can include a fan mounted in the air channel and configured to provide forced convection over a surface of the electronic device. The electronic device case can include a heat dissipation device within the case, where the heat dissipation device includes a heat sink in physical contact with an outer surface of the electronic device, and where the heat sink is thermally connected to a fin structure on an outer surface of the case.

The components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. An electronic device case comprising:
   a front shell;
   a back shell attachable to the front shell, wherein the front shell and the back shell at least partially surround an electronic device when the electronic device is installed in the case;
   a payment device reader attached to the case and electrically connected to the electronic device when the electronic device is installed in the case;
   a product information input device attached to the case and electrically connected to the electronic device when the electronic device is installed in the case;
   at least one electromechanical button attached to the case and electrically connected to one or more of the payment device reader and the product information input device such that actuation of the electromechanical button activates one or more of the payment device reader and the product information input device;
   a trigger member attached to the case such that depression of the trigger member actuates the electromechanical button; and
   a battery electrically connected to the electronic device when the electronic device is installed in the case.

2. The electronic device case of claim 1, further comprising:
   a rotatable mount attached to an outer surface of the case; and
   a hand strap attached to the rotatable mount.

3. The electronic device case of claim 2, wherein the rotatable mount comprises a first mount portion and a second mount portion, wherein the second mount portion is rotatably captured between the first mount portion and an outer surface of the back shell, and wherein the second mount portion can rotate with respect to the first mount portion and the back shell.

4. The electronic device case of claim 3, wherein the second mount portion comprises a first opening and a second opening, and wherein the hand strap extends between the first opening and the second opening to form a hand slot configured to receive a user's hand, wherein the hand strap is attached to the second mount at the first opening and the second opening, and wherein the trigger member is attached to the back shell and accessible by the user's hand when the user's hand is in the hand strap.

5. The electronic device case of claim 3, wherein the first mount portion comprises an external ring gear comprising at least one tooth, the external ring gear extending at least partially around an outer cylindrical surface of the first mount portion, and wherein the second mount portion comprises an internal ring gear comprising at least one tooth, the internal ring gear extending at least partially around an inner cylindrical surface of a thru hole in the second mount portion, wherein the thru hole in the second mount portion is configured to receive the first mount portion when the first and second mount portions are assembled to the back shell, and further comprising a radial clearance distance between the external ring gear and the internal ring gear to allow the second mount portion to rotate freely with respect to the first mount portion when the first and second mount portions are assembled to the back shell.

6. The electronic device case of claim 5, wherein the radial clearance distance between the external ring gear of the first mount portion and the internal ring gear of the second mount portion is about 0.010-0.050 inches.

7. The electronic device case of claim 5, wherein the second mount portion comprises a first upright portion and a second upright portion, and wherein deflection of the first upright portion and the second upright portion toward each other causes the internal ring gear of the second mount portion to engage the external ring gear of the first mount portion.

8. The electronic device case of claim 7, wherein applying a clockwise rotational force to the second mount portion while the internal ring gear of the second mount portion is engaged with the external ring gear of the first mount portion allows for installation of the first and second mount portions to the back shell, and wherein applying a counterclockwise rotational force to the second mount portion while the internal ring gear of the second mount portion is engaged with the external ring gear of the first mount portion allows for removal of the first and the second mount portions from the back shell.

9. The electronic device case of claim 1, wherein the product information input device includes a bar code reader.

10. The electronic device case of claim 1, wherein the payment device reader includes a magnetic card reader.

11. The electronic device case of claim 1, the trigger member further comprising:
    a base portion attached to an inner surface of the back shell;
    a plurality of fingers; and
    an arcuate portion, wherein the fingers extend from the base portion to the arcuate portion of the trigger member, wherein the arcuate portion of the trigger member is located proximate an inner surface of the trigger member, and wherein depressing the trigger member deflects the arcuate portion relative to the base portion to actuate the at least one button.

12. The electronic device case of claim 11, wherein the at least one electromechanical button includes a first button and a second button and wherein depressing a first portion of the trigger member actuates the first button, and wherein depressing a second portion of the trigger member actuates the second button.

13. The electronic device case of claim 1, further comprising a shoulder strap comprising a first end and a second end, wherein the first end is attachable to a first attachment point on a first side surface of the case, wherein the second end is attachable to a second attachment point on a second side surface of the case, and wherein the case can swivel with respect to the first and second ends of the shoulder strap when the first and second ends of the shoulder strap are attached to the first and second attachment points, respectively.

14. The electronic device case of claim 1, further comprising a flexible membrane covering a display opening in the front shell of the case, wherein the flexible membrane allows for operation of a touch screen of the electronic device.

15. The electronic device case of claim 14, wherein the flexible membrane has a thickness ranging from about 0.004 to 0.020 inches.

16. The electronic device case of claim 1, further comprising an air channel formed in the case, wherein the air channel extends from an outer surface of the electronic device to an opening in an outer surface of the case, and wherein the air channel allows for dissipation of heat from the electronic device through the opening in the outer surface of the case.

17. The electronic device case of claim 16, further comprising a fan mounted in the air channel and configured to provide forced convection over a surface of the electronic device.

18. The electronic device case of claim 1, further comprising a heat dissipation device within the case, wherein the heat dissipation device comprises a heat sink in physical contact with an outer surface of the electronic device when the electronic device is installed in the case.

19. A protective case for an electronic device, the protective case comprising:
- a front shell;
- a back shell attachable to the front shell to at least partially surround the electronic device when the electronic device is installed in the case;
- a payment device reader attached to the case and electrically connected to the electronic device when the electronic device is installed in the case;
- a product information input device attached to the case and electrically connected to the electronic device when the electronic device is installed in the case;
- at least one button attached to the case, the button being electrically connected to one or more of the payment device reader and the product information input device;
- a trigger member attached to the case such that depression of the trigger member actuates the at least one button to provide an input to the electronic device, the input associated with information displayed on a screen of the electronic device; and
- a battery electrically connected to the electronic device when the electronic device is installed in the case.

20. The protective case of claim 19 wherein the at least one button includes a first button and a second button and wherein depression of a first portion of the trigger member actuates the first button and depression of a second portion of the trigger member actuates the second button.

21. The protective case of claim 19, further comprising an air channel formed in the case, wherein the air channel extends from an outer surface of the electronic device to an opening in an outer surface of the case, and wherein the air channel allows for dissipation of heat from the electronic device through the opening in the outer surface of the case.

22. The electronic device protective case of claim 21, further comprising a fan mounted in the air channel and configured to provide forced convection over a surface of the electronic device.

* * * * *